United States Patent
Isshiki et al.

[11] Patent Number: 5,828,975
[45] Date of Patent: Oct. 27, 1998

[54] METHOD AND DEVICE FOR CALCULATING TURNING RADIUS OF VEHICLE TAKING LOAD MOVEMENT THEREOF INTO CONSIDERATION

[75] Inventors: Isao Isshiki; Mikao Nakajima, both of Osaka, Japan

[73] Assignees: Sumitomo Rubber Industries, Ltd.; Sumitomo Electric Industries, Ltd., both of Hyogo, Japan

[21] Appl. No.: 557,322

[22] Filed: Nov. 14, 1995

[30] Foreign Application Priority Data

Nov. 21, 1994 [JP] Japan ................................. 6-286928

[51] Int. Cl.$^6$ .............................. G06F 7/70; B60C 23/02
[52] U.S. Cl. ............................ 701/72; 701/70; 73/146.2; 73/146.5; 340/444; 340/671
[58] Field of Search .................. 364/426.01, 424.034, 364/424.098, 426.03, 426.034, 424.051, 426.028, 426.029; 73/146.5, 146, 514.39, 146.2; 340/444, 671, 438, 441, 442; 180/197, 65.2, 243, 249, 76, 415, 233; 303/140; 701/69, 70, 71, 72

[56] References Cited

U.S. PATENT DOCUMENTS

| 5,099,940 | 3/1992 | Imaseki et al. ................ 364/424.051 |
| 5,197,566 | 3/1993 | Watanabe et al. ............... 364/424.098 |
| 5,473,544 | 12/1995 | Yamashita ........................ 364/426.032 |
| 5,557,552 | 9/1996 | Naito et al. ..................... 364/424.034 |
| 5,591,906 | 1/1997 | Okawa et al. ..................... 364/426.01 |

FOREIGN PATENT DOCUMENTS

| 0466535A1 | 7/1990 | European Pat. Off. . |
| 0656268A1 | 9/1993 | European Pat. Off. . |
| 60-113710 | 6/1985 | Japan . |
| PCT/JP93/01316 | 9/1993 | Japan . |

*Primary Examiner*—Jacques H. Louis-Jacques
*Attorney, Agent, or Firm*—Rabin & Champagne, P.C.

[57] ABSTRACT

A method of and a device for determining a turning radius of a vehicle, accurately, without being influenced by the load movement of the vehicle, are disclosed. The rotational angular velocities of left and right tires are detected, respectively. The turning radius of the vehicle is determined, based on the detected rotational angular velocity, by taking a change in effective rolling radiuses due to the load movement of the vehicle into consideration.

54 Claims, 11 Drawing Sheets

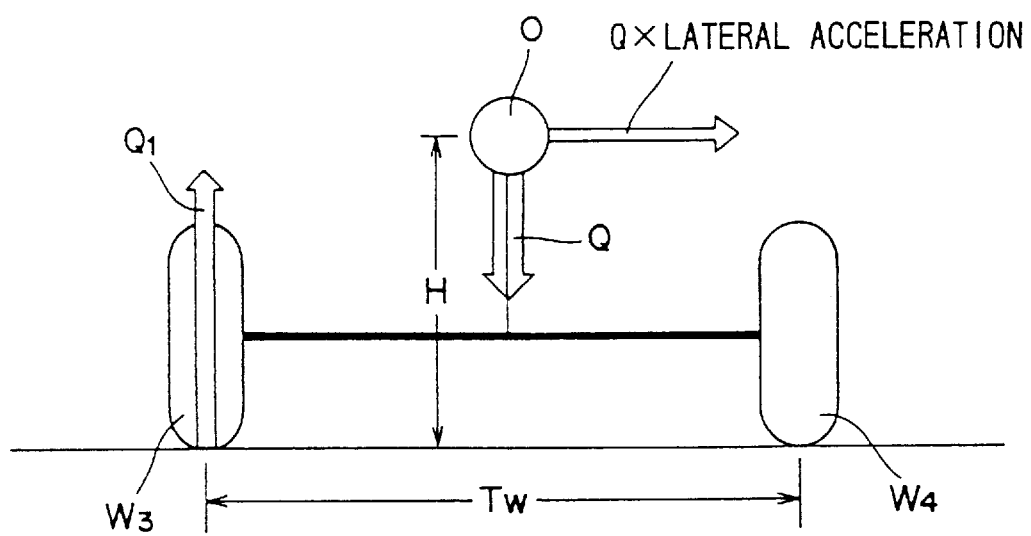
F I G. 4

F I G. 5
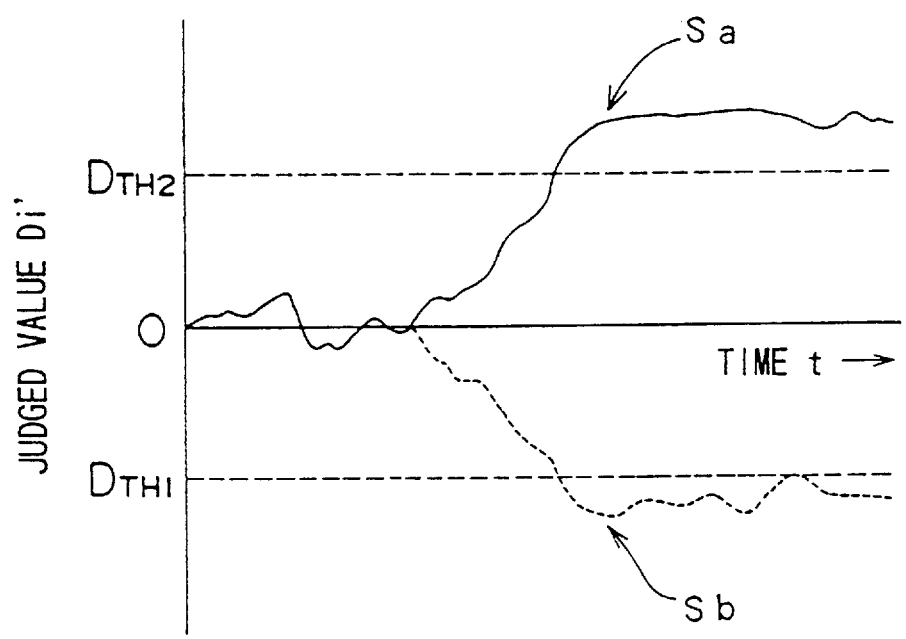

F I G. 10
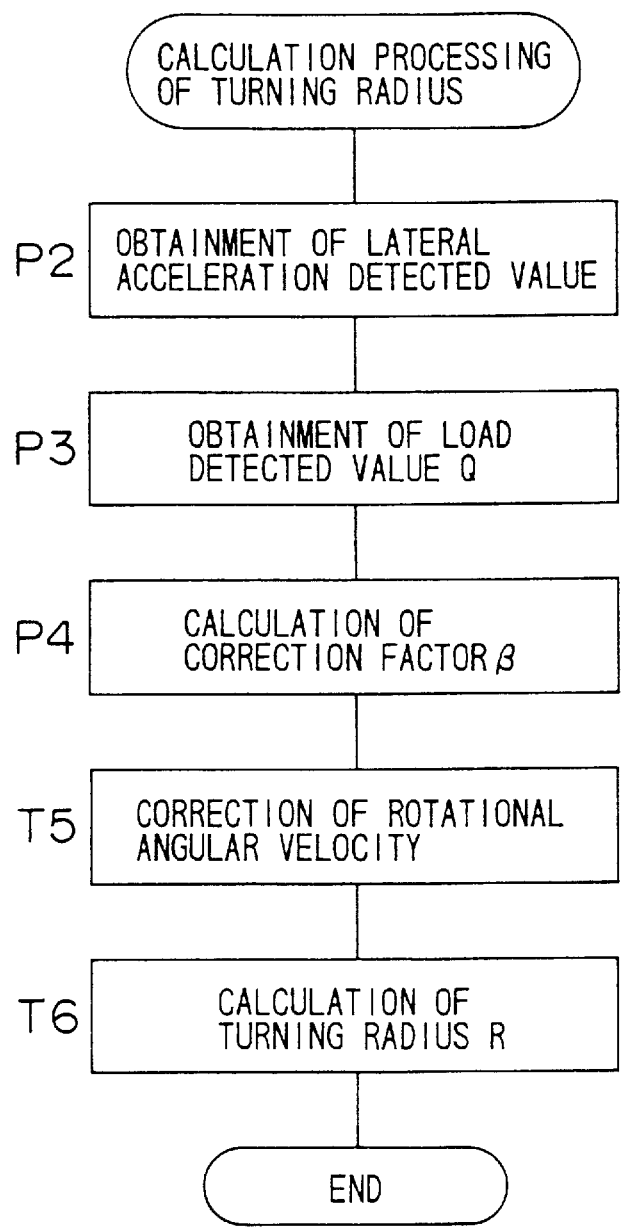

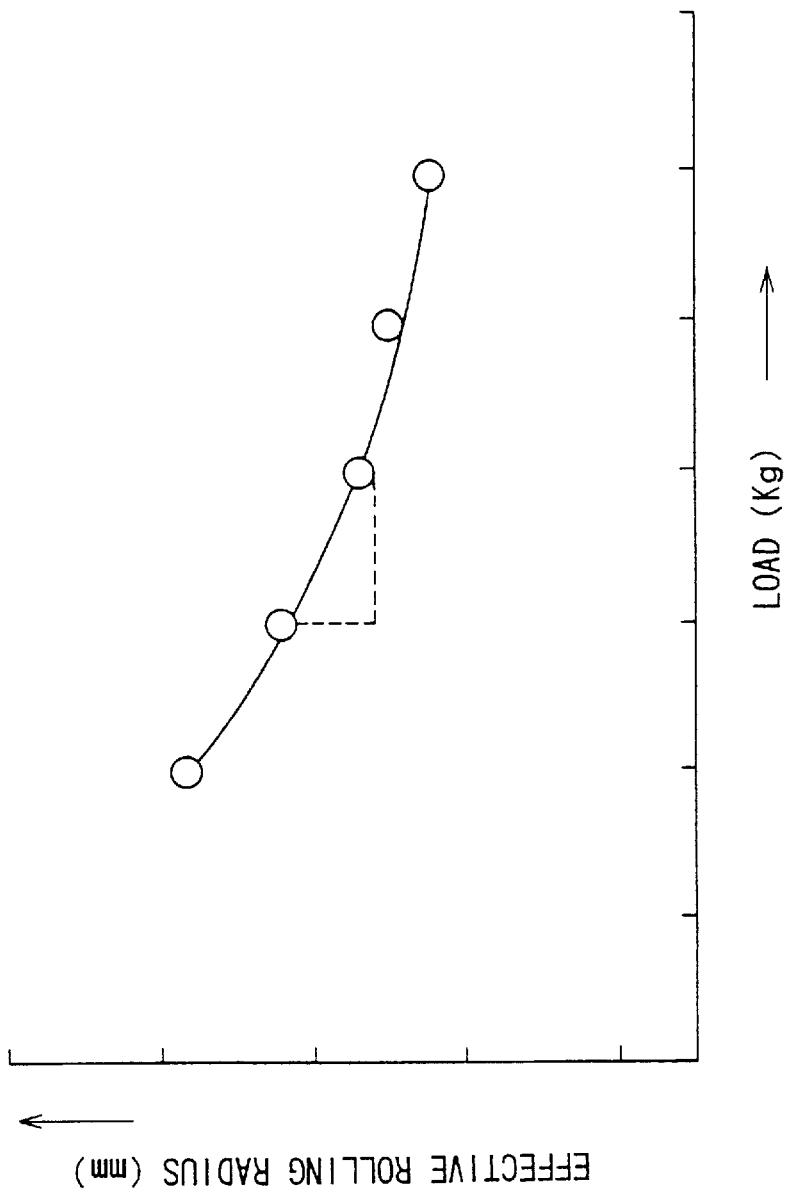

METHOD AND DEVICE FOR CALCULATING TURNING RADIUS OF VEHICLE TAKING LOAD MOVEMENT THEREOF INTO CONSIDERATION

BACKGROUND OF THE INVENTION

1. Field of the Invention

The present invention relates to a method of and a device for calculating a turning radius of a vehicle.

2. Description of Related Art

The turning radius of a vehicle is, for example, a curvature radius of the path swept out by the center of gravity of the vehicle. For example, the turning radius of a vehicle is utilized for a tire pressure drop detecting device which has been developed for the purpose of securing safety of the vehicle, for an Anti-lock Braking System (ABS) or Navigation System.

A method of determining the turning radius of a vehicle is classified roughly into one of two types. One type utilizes an output of a steering angle sensor. The other is a method of utilizing the respective rotational angular velocities $F_1$, $F_2$, $F_3$ and $F_4$ of four tires provided for the vehicle. The tires $W_1$ and $W_2$ are right front and left front tires, respectively. In addition, the tires $W_3$ and $W_4$ are right rear and left rear tires, respectively.

The rotational angular velocity $F_i$ (i is 1, 2, 3 or 4) varies depending on the right or left tire $W_i$ when the vehicle is traveling at a corner or curve (hereinafter represented by the "corner"). For example, the rotational angular velocity $F_i$ of the tire $W_i$ which is located on the inside to the corner is relatively small, and the rotational angular velocity $F_i$ of the tire $W_i$ on the outside is relatively large, because there is a difference between the turning radius of the tire $W_i$ on the inside of the corner and that of the tire $W_i$ on the outside of the corner. Accordingly, the turning radius of the vehicle can be determined by utilizing each rotational angular velocity $F_i$ of right and left tires.

One embodiment of a method of determining the turning radius of a vehicle on the basis of the rotational angular velocity $F_i$ of the tire $W_i$ is disclosed, for example, in Japanese Laid-Open Patent Publication No. 60-113710. For example, the turning radius (R) can be calculated by the following equation (1) letting the distance between kingpins (tread width) be k:

$$R=k/2\times[F_2(F_4)+F_1(F_3)]/[F_2(F_4)-F_1(F_3)] \quad (1).$$

In addition, the above equation (1) represents that $F_1$ and $F_3$ as well as $F_2$ and $F_4$ can be exchanged, respectively.

By the way, when a vehicle is traveling at a corner, a lateral acceleration, which is proportional to the speed of the vehicle, is exerted on the vehicle in the direction toward the outside of the corner. Thereby, the load of the vehicle moves toward the outside of the corner. As a result, the load exerted on the tire $W_i$ on the outside of the corner increases relatively and, at the same time, the load exerted on the tire $W_i$ on the inside of the corner decreases relatively.

FIG. 11 is a graph showing the relationship between the load exerted on the tire $W_i$ and effective rolling radius of the tire $W_i$. The effective rolling radius is a value obtained by dividing by $2\pi$ a travel distance of the vehicle while the tire makes one free revolution. As is apparent from the graph shown in FIG. 11, the effective rolling radius of the tire $W_i$ decreases as the load exerted on the tire $W_i$ increases.

Accordingly, the effective rolling radius of the tire $W_i$ on the outside of the corner where the load increases becomes relatively small and, at the same time, the effective rolling radius of the tire $W_i$ on the inside of the corner where the load increases becomes relatively large. On the other hand, the rotational angular velocity $F_i$ of the tire $W_i$ varies depending on the effective rolling radius of the tire $W_i$. That is, if the speed of the vehicle is constant, the rotational angular velocity $F_i$ becomes large when the effective rolling radius of the tire $W_i$ becomes small. Consequently, the rotational angular velocity $F_i$ of the tire $W_i$ is influenced by not only difference in turning radius between inner and outer wheels, but also load movement of the vehicle, at the time of cornering. Therefore, the turning radius R calculated by the above formula (1) is a value influenced by the load movement of the vehicle and is not an accurate value.

SUMMARY OF THE INVENTION

The first object of the present invention is to provide a method capable of calculating a turning radius of a vehicle, accurately, regardless of the load movement of the vehicle.

The second object of the present invention is to provide a device capable of calculating a turning radius of a vehicle, accurately, without being influenced by the load movement of the vehicle.

The third object of the present invention is to provide a tire pressure drop detecting method, utilizing a turning radius of a vehicle calculated, accurately, without being influenced by the load movement of the vehicle.

The fourth object of the present invention is to provide a tire pressure drop detecting device, utilizing a turning radius of a vehicle calculated, accurately, without being influenced by the load movement of the vehicle.

According to the present invention, the turning radius of the vehicle having left and right tires can be determined. For this purpose, the rotational angular velocities of the left and right tires are detected. The turning radius of the vehicle is determined, on the basis of the detected rotational angular velocities, by taking a change in effective rolling radiuses due to the load movement of the vehicle into consideration. Thereby, the turning radius of the vehicle can be calculated, accurately, without being influenced by the load movement of the vehicle.

For example, the lateral acceleration of the vehicle may be detected. In this case, it is preferred that an influence of the change in effective rolling radiuses of tires due to the load movement of the vehicle on the rotational angular velocities is excluded on the basis of the detected lateral acceleration of the vehicle. The load movement of the vehicle is proportional to the lateral acceleration of the vehicle so that the turning radius of the vehicle in which the influence of the load movement of the vehicle is excluded, is calculated by taking the lateral acceleration into consideration.

In addition, a correction factor may be determined on the basis of the load of the vehicle to exclude the influence of the change in effective rolling radiuses of tires due to the load movement of the vehicle on the rotational angular velocities, using the resulting correction factor and lateral acceleration of the vehicle. When the correction factor is determined, a constant corresponding to the load of the vehicle may be used, but it is preferred to detect the load of the vehicle, thereby determining the correction factor on the basis of this detected value.

If the load is detected to determine the correction factor, the correction factor can be altered according to the load of the vehicle. The load of the vehicle varies depending on the numbers of persons in the vehicle and quantity of the baggage in the vehicle, thereby changing the load to be moved. Accordingly, there can be obtained the turning radius of the vehicle without the influence of the load movement of the vehicle, more certainly, by detecting the load of the vehicle each time.

Furthermore, the speeds of the left and right tires may be determined by multiplying the detected rotational angular velocities by a constant corresponding to the effective rolling radius of the tire at the time of linear traveling to correct the resulting speeds of right and left tires so as to exclude the influence of a change in effective rolling radius of the tire due to the load movement of the vehicle on rotational angular velocities. In this case, it is preferred that the turning radius of the vehicle is determined on the basis of the corrected speeds of right and left tires.

It is preferred that the speeds of right and left tires are corrected, for example, according to the following equations:

$$V2_3 = (1+\beta \times \text{lateral acceleration}) \times V1_3$$

$$V2_4 = (1-\beta \times \text{lateral acceleration}) \times V1_4$$

where $\beta = (Q \times H \times \alpha)/Tw \times 100$, $V2_3$ is a speed of the left tire after correction, $V2_4$ is a speed of the right tire after correction, $V1_3$ is a speed of the left tire before correction, $V1_4$ is a speed of the right tire before correction, lateral acceleration (a) is an acceleration in the lateral direction of the vehicle. It takes on a positive value for the acceleration directed from the left tire to the right tire, and on takes a negative value for the acceleration directed from the right tire to the left tire, Q is a load of the vehicle, H is a height from the ground surface of the tire to the center of gravity of the vehicle, $\alpha$ is a rate of change (%) of the effective rolling radius of the tire to the load, and Tw is a distance between the right and left tires.

In this case, it is preferred that the turning radius of the vehicle is determined according to the following equation:

$$R = \frac{Tw}{2} \times \frac{V2_4 + V2_3}{V2_4 - V2_3}$$

In addition, the first vehicle turning radius R' in which an influence due to the load movement of the vehicle is not taken into consideration may be determined on the basis of the detected rotational angular velocities to determine the second vehicle turning radius R, which is not influenced by the load movement of the vehicle, by correcting the resulting first vehicle turning radius R' taking the influence of the change in effective rolling radiuses of tires due to the load movement of the vehicle into consideration.

In this case, a correction factor may be determined on the basis of the load of the vehicle to exclude the influence of the change in effective rolling radiuses of tires due to the load movement of the vehicle on the rotational angular velocities, using the resulting correction factor. In this case, it is preferred to detect the load of the vehicle.

Furthermore, it is preferred that the speeds of right and left tires are determined by multiplying the detected rotational angular velocities by a constant corresponding to the effective rolling radius of the tire at the time of linear traveling, to calculate the first vehicle turning radius R' on the basis of the resulting speeds of right and left tires.

For example, the first vehicle turning radius R' may be determined according to the following equation:

$$R' = \frac{Tw}{2} \times \frac{V1_4 + V1_3}{V1_4 - V1_3}$$

where $VI_3$ is the speed of the left tire, determined by multiplying the detected rotational angular velocity by the constant corresponding to the effective rolling radius of the tire at the time of linear traveling, $VI_4$ is the speed of the right tire, determined by multiplying the detected rotational angular velocity by the constant corresponding to the effective rolling radius of the tire at the time of linear traveling.

Furthermore, it is preferred that the second vehicle turning radius R is calculated by correcting the first vehicle turning radius R' according to the following equation:

$$R = R' \times \{\gamma + \sigma \times (V1_4 + V1_3)^2\}$$

where $\gamma$ and $\sigma$ respectively indicate correction factors, $\sigma = (1/9.8) \times (\beta/2Tw)$, and $\beta = (Q \times H \times \alpha)/Tw \times 100$.

The lateral acceleration of the vehicle is proportional to the square of the speed of the vehicle. Therefore, $(V1_4 + V1_3)^2$ in the above formula can be said to be a term corresponding to the lateral acceleration according to the vehicle. Accordingly, the first vehicle turning radius R' can be corrected by taking the lateral acceleration of the vehicle into consideration according to the above formula. And besides, it is unnecessary to detect the lateral acceleration of the vehicle, directly.

In addition, the detected rotational angular velocities of right and left tires may be corrected so as to exclude the influence of the change in effective rolling radiuses of the tires due to the load movement of the vehicle on the rotational angular velocities to calculate the turning radius on the basis of the resulting corrected rotational angular velocities of right and left tires.

It is preferred that the rotational angular velocities are corrected, for example, according to the following equation:

$$F3_3 = (1+\beta \times \text{lateral acceleration})F1_3$$

$$F3_4 = (1-\beta \times \text{lateral acceleration})F1_4$$

where $F3_3$ is a rotational angular velocity of the left tire after correction, $F3_4$ is the rotational angular velocity of the right tire after correction, $F1_3$ is the detected value of the rotational angular velocity of the left tire, and $F1_4$ is the detected value of the rotational angular velocity of the right tire.

In this case, it is preferred that the turning radius R of the vehicle is determined according to the following equation:

$$R = \frac{Tw}{2} \times \frac{F3_4 + F3_3}{F3_4 - F3_3}$$

In addition, it is preferred that the left and right tires are following driven tires which follow along as the vehicle moves on the ground surface. When the vehicle is traveling at a corner, the driving tire on the inside of the corner is liable to slip, while the following tire is likely to slip hardly at all. Accordingly, the rotational radius can be accurately calculated by utilizing the rotational angular velocities of the following tires without taking a slip page into consideration. Therefore, it is possible to simplify processing.

The turning radius of the vehicle, in which the influence of the change in effective rolling radiuses of the tires due to the load movement of the vehicle is excluded, thus obtained as described above, may be utilized for judging whether the pneumatic pressure of the tires provided for the vehicle drops or not. More concretely, it may be detected whether any tire provided for the vehicle causes a pressure drop or not, under the condition that the turning radius is larger than a predetermined value. In this case, it is preferred to inhibit the detection of the tire pressure drop, if the turning radius of the vehicle is smaller than the predetermined value.

The turning radius of the vehicle can be used, for example, for judging whether the vehicle is traveling linearly or traveling at a corner. Since the vehicle can cause a linear slip when traveling at a severe corner, the tire pressure drop is not likely to be detected accurately. Therefore, the tire pressure drop can be appropriately detected by deciding whether or not the tire pressure drop should be detected based on whether or not the turning radius of the vehicle is large. In this case, when using the turning radius in which the influence of the load movement on the vehicle is excluded, it is possible to carry out the judgment whether the tire pressure drop should be detected or not, accurately.

In addition, the above detected rotational angular velocities may be corrected by using the turning radius of the vehicle, in which the influence of a change in effective rolling radiuses of the tires due to the load movement of the vehicle, to determine the rotational angular velocities wherein scatter of the rotational angular velocities caused by a difference in inner and outer wheels between the left and right tires is excluded. It may also be judged whether any tire causes the pressure drop or not, on the basis of the resulting rotational angular velocities. Thereby, the tire pressure drop can be detected, satisfactory.

Furthermore, the tire whose pneumatic pressure drops may also be specified on the basis of the above corrected rotational angular velocities. Thereby, the tire whose pneumatic pressure drops can be accurately specified.

The above objects as well as other objects, features and advantages of the present invention will become more apparent to those skilled in the art from the following description with reference to the accompanying drawings.

BRIEF DESCRIPTION OF DRAWINGS

FIG. 4 is an illustration for explaining a lateral acceleration exerted on the vehicle.

FIG. 5 is a graph for explaining the judging method of the tire pressure drop.

FIG. 10 is a flow chart for explaining the calculation processing of the turning radius according to the third embodiment of the present invention.

FIG. 11 is a graph showing the relationship between the load exerted on a tire and effective rolling radius of the tire.

DESCRIPTION OF THE PREFERRED EMBODIMENTS

<First embodiment>

Figure 1:
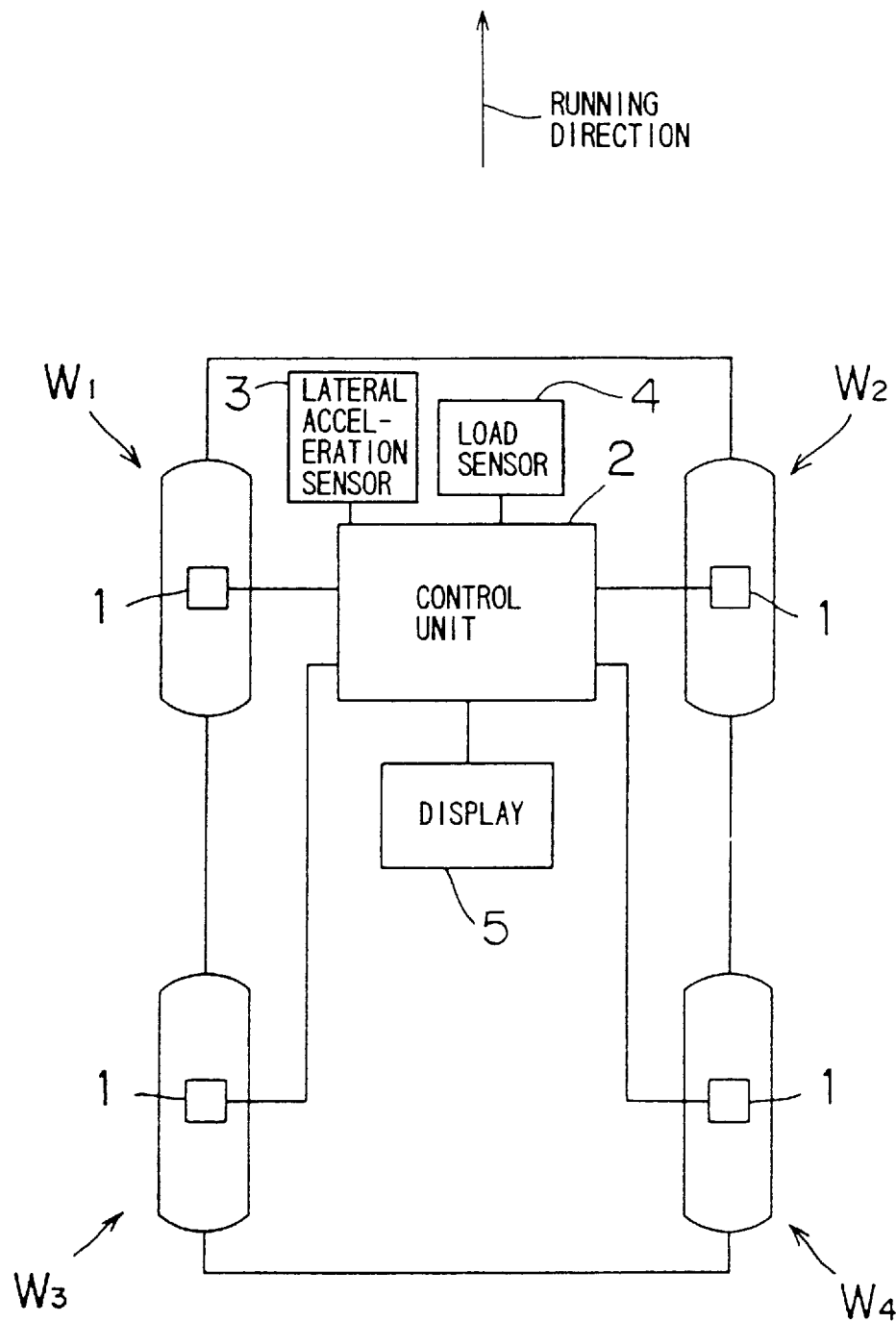
FIG. 1 is a block diagram showing the fundamental construction of a tire pressure drop detecting device to which one embodiment of the present invention is applied.

FIG. 1 is a block diagram showing the fundamental construction of a tire pressure drop detecting device to which one embodiment of the present invention is applied. This tire pressure drop detecting device detects whether the pneumatic pressures of four tires $W_1$, $W_2$, $W_3$ and $W_4$ provided for a four-tire vehicle drop or not, respectively. The tires $W_1$ and $W_2$ correspond to right front and left front tires, and the tires $W_3$ and $W_4$ correspond to right rear and left rear tires, respectively. In addition, these tires may be referred to as a "tire $W_i$" hereinafter.

The tires $W_1$, $W_2$, $W_3$ and $W_4$ are associated with a wheel speed sensors 1 serving as rotational angular velocity detecting means, respectively. Output signals of each of the wheel speed sensor 1 are supplied to a control unit 2. A lateral acceleration sensor 3, a load sensor 4 and an indicator 5 are connected to the control unit 2. The lateral acceleration sensor 3 serves as lateral acceleration detecting means for detecting a lateral acceleration of the vehicle. The load sensor 4 serves as load detecting means for detecting a load of the vehicle. The indicator 5 is used to inform the tire $W_i$ whose pneumatic pressure possibly drops and may be constructed in forms of a liquid display element, a plasma display element or CRT.

In this embodiment, the control unit 2 corresponds to the turning radius operating means.

Figure 2:
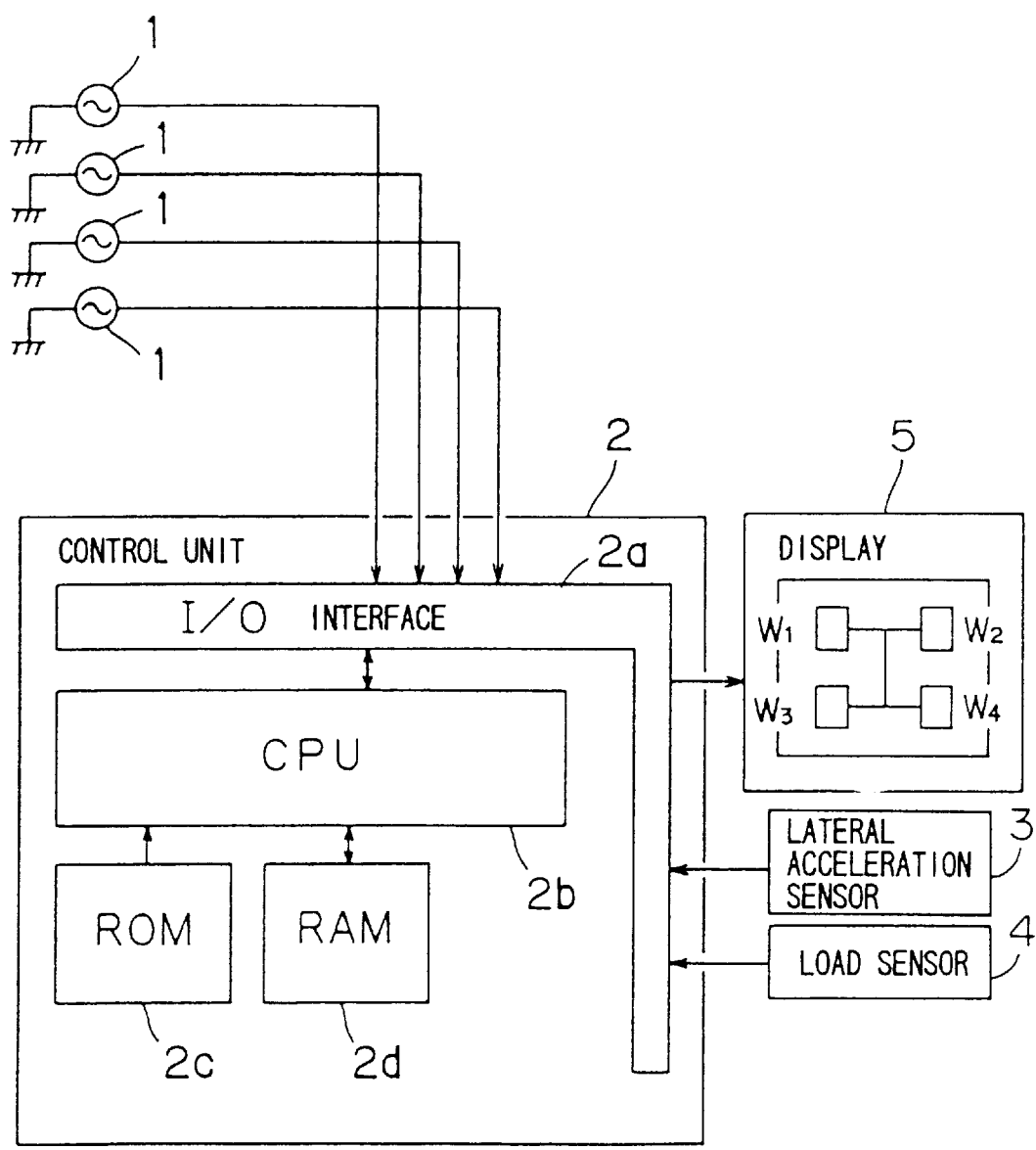
FIG. 2 is a block diagram showing the electrical construction of a tire pressure drop detecting device.

FIG. 2 is a block diagram showing the electrical construction of a tire pressure drop detecting device. The control unit 2 is composed of a micro computer including an I/O interface 2a, a CPU 2b, a ROM 2c and a RAM 2d. The I/O interface 2a is used to send and receive signals to and from an external device. The CPU 2b serves as the center of operation processing. A control operation program of the CPU 2b is stored in the ROM 2c. Data, etc. are temporarily written to or the written data are read out from the RAM 2d when the CPU 2b performs a control operation.

Each of the wheel speed sensor 1 generates pulse signals corresponding to the rotating speed of the corresponding tire $W_i$ (hereinafter referred to as a "wheel speed pulse"). The CPU 2b calculates the rotational angular velocity $F_i$ (i=1, 2, 3 or 4) of each tire $W_i$ on the basis of the wheel speed pulses generated from the corresponding wheel speed sensor 1 for each predetermined sampling period ΔT (sec)(e.g. ΔT=1).

Figure 3:
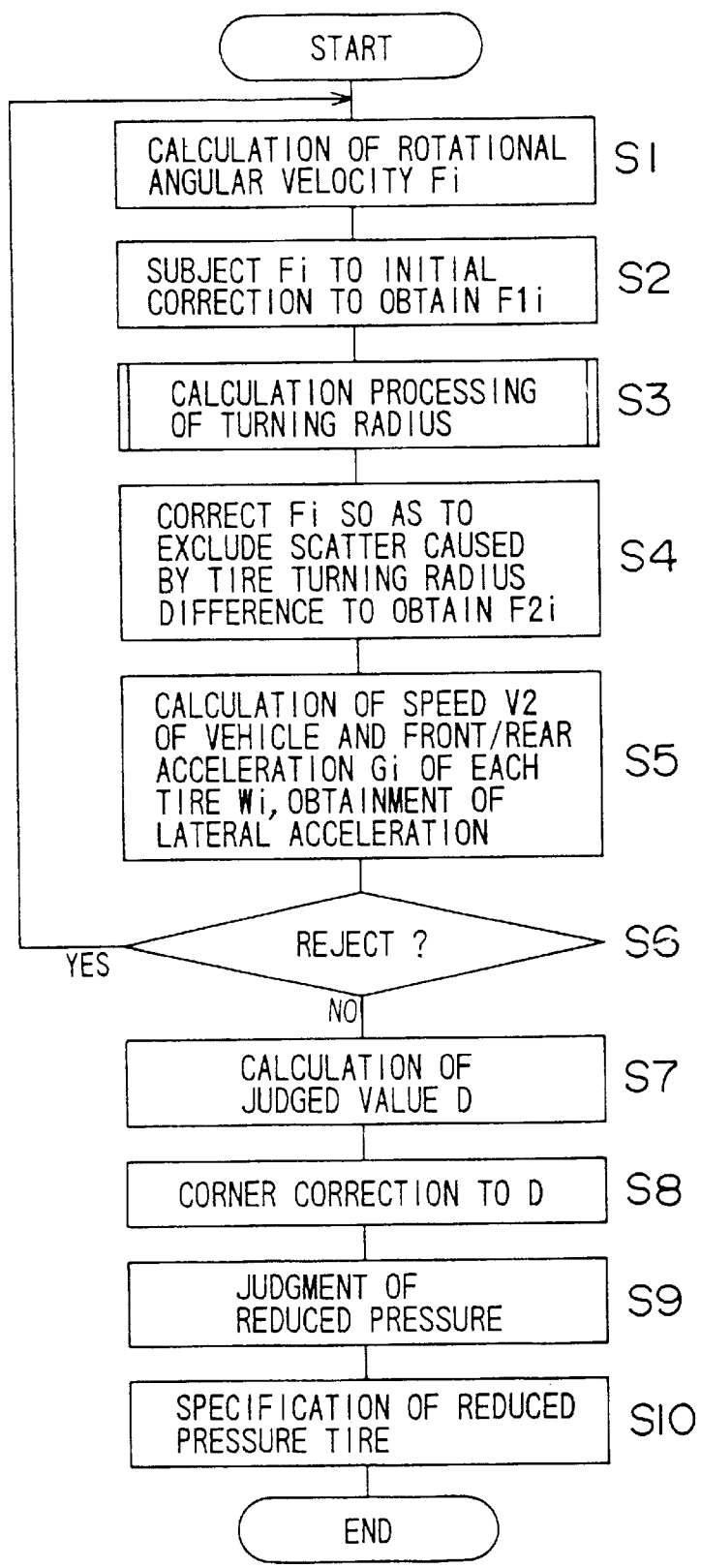
FIG. 3 is a flow chart for explaining the detection processing of the tire pressure drop.

FIG. 3 is a flow chart for explaining the detection processing of tire pressure drop, which is performed by the control unit 2. This processing is realized by a software processing. In the following explanation, the explanation will be made with respect to an FF (front engine-front drive) vehicle as the objective vehicle. That is, right front and left front tires $W_1$, and $W_2$ are driving tires which rotate actively by applying a driving force from the engine. In addition, right rear and left rear tires $W_3$ and $W_4$ are following driven tires rolling on the ground surface as the vehicle moves.

According to this tire pressure drop detection processing, the rotational angular velocity $F_i$ of each tire $W_i$ is firstly calculated on the basis of the wheel speed pulse generated from each wheel speed sensor 1 (step S1).

Scatter within a specification (hereinafter referred to as an "initial difference") is permitted with respect to the tires $W_i$ at the time of production. Therefore, the effective rolling radiuses of the tires $W_i$ are not the same, necessarily, even if the tires $W_i$ show a normal pneumatic pressure. Therefore, the rotational angular velocities $F_i$ of the tires $W_i$ may scatter even when the vehicle is traveling linearly.

The effective rolling radius is a value obtained by dividing by $2\pi$ a travel distance of the vehicle while the tire makes one free revolution. The constant r corresponding to the effective rolling radius when the vehicle is traveling linearly is previously stored in the ROM 2c.

Once the rotational angular velocities $F_i$ has been calculated in the step S1, the calculated rotational angular velocities are corrected so as to exclude scatter due to the initial difference (step S2). For example, the calculations according to the following equations (2) to (5) are carried out to determine rotational angular velocities $F1_1$, $F1_2$, $F1_3$ and $F1_4$ after initial correction.

$$F1_1 = F_1 \tag{2}$$

$$F1_2 = aF_2 \tag{3}$$

$$F1_3 = F_3 \tag{4}$$

$$F1_4 = bF_4 \tag{5}$$

The correction factors a and b are, for example, determined when the vehicle travels for the first time, when the tire $W_i$ is filled with air or when the tire $W_i$ is replaced, and they are previously stored in the ROM 2c of the control unit 2. The correction factors a and b are determined, for example, by calculating the rotational angular velocities $F_i$ under the condition that the vehicle is traveling linearly and then solving, on the basis of the calculated rotational angular velocities $F_i$, the following equations (6) and (7):

$$a = F_1/F_2 \tag{6}$$

$$b = F_3/F_4 \tag{7}$$

The rotational angular velocities $F_i$ of the tires $W_i$ vary depending on the above initial difference and is also influenced by the difference in inner and outer wheels and load movement of the vehicle. That is, the inner and outer tires differ in rotational angular velocity because of a difference between the turning radius of the tire $W_i$ on the inside of a corner or curve (hereinafter represented by the "corner") and that of the tire $W_i$ on the outside of the corner (hereinafter referred to as a "tire turning radius difference") when the vehicle is traveling at the corner or curve. In addition, when the vehicle passes through the corner, the movement of the load occurs due to a centrifugal force, thereby increasing the effective rolling radius of the inner tire and decreasing that of the outer tire. Therefore, the rotational angular velocities vary between inner and outer tires due to the influence of the load movement of the vehicle.

It will be explained, more concretely, hereinafter. That is, when the vehicle is traveling at the corner curved to the left direction, the turning radiuses of the tires $W_1$ and $W_3$ on the inside of the corner become relatively small, while the turning radiuses of the tires $W_2$ and $W_4$ on the outside of the corner become relatively large. Accordingly, the rotational angular velocities $F_1$ and $F_3$ of the tires $W_1$ and $W_3$ on the inside of the corner become relatively large, while the rotational angular velocities $F_2$ and $F_4$ of the tires $W_2$ and $W_4$ on the outside of the corner become relatively small. As a result, the rotational angular velocity $F_i$ as between with right and left tires.

In addition, when a vehicle is traveling at the corner curved to the left direction, as shown in FIG. 4, a lateral acceleration, which is inversely proportional to the turning radius R and proportional to the square of the speed V of the vehicle, is exerted on the center of gravity O of the vehicle toward the outside of the corner (toward the right side of the vehicle). In this case, the following equation (8), representing the balance of the moment, is established.

$$Tw \times Q_1 + Q \times H \times \text{lateral acceleration} = (Tw/2) \times Q \tag{8}$$

where

Q is a load (kgf) of the vehicle,

Tw is a distance between following tires $W_3$ and $W_4$ (i.e. tread width), $Q_1$ is a counterforce (kgf) from the ground surface to a partial load exerted on the tire $W_3$ among the load Q of the vehicle (hereinafter referred to as a "load counterforce"), H is a height (m) of gravity O of the vehicle from the ground surface of the center, and lateral acceleration takes a positive value when it is exerts in the direction from the left tire $W_3$ to the right tire $W_4$, and takes a negative value when it is exerted in the direction from the right tire $W_4$ to the left tire $W_3$.

Solving the above equation (8) for the load counterforce $Q_1$ of the following tire $W_3$ gives the following equation (9):

$$Q_1 = \{(Tw/2) \times Q - Q \times H \times \text{lateral acceleration}\}/Tw = (Q/2) - (Q \times H \times \text{lateral acceleration})/Tw. \tag{9}$$

When the vehicle is traveling linearly, the load Q of the vehicle is exerted uniformly on the following tires $W_3$ and $W_4$. Therefore, the load counterforce $Q_1$ of the following tire $W_3$ becomes $Q/2$. Accordingly, it is understood that, when the vehicle is traveling at the corner, the load corresponding to ($Q \times H \times$ lateral acceleration) of the second term of the above equation (9) moves from the inside of the corner to the outside of the corner. Thereby, the effective rolling radiuses of the following tires $W_3$ and $W_4$ vary by the value represented by the following factor letting the change rate of the effective rolling radius of the tire $W_i$ due to the load, be $\alpha$ (%):

$$\times H \times \text{lateral acceleration} \times \alpha)/Tw(\%) \tag{10}$$

Accordingly, the effective rolling radiuses of the following tire $W_3$ on the inside of the corner and following tire $W_4$ on the outside of the corner become the value represented by the following expressions, respectively, assuming the effective rolling radiuses without any change due to the load movement be 1:

$$1 + (Q \times H \times \alpha \times \text{lateral acceleration})/(Tw \times 100) \tag{11}$$

$$1 - (Q \times H \times \alpha \times \text{lateral acceleration})/(Tw \times 100) \tag{12}$$

If the expressions (11) and (12) are simplified by substituting the following equation:

$$\beta = (Q \times H \times \alpha)/(Tw \times 100) \tag{13}$$

the above expressions (11) and (12) can be modified into the following expressions:

$$(1+\beta \times \text{lateral acceleration}) \quad (14)$$

$$(1-\beta \times \text{lateral acceleration}) \quad (15)$$

Hereinafter, the above β is referred to as a "first correction factor".

In such a way, when the vehicle is traveling at a corner, the rotational angular velocities $F_i$ vary with inner and outer tires due to the tire turning radius difference and, at the same time, the rotational angular velocities $F_i$ of inner and outer tires are respectively influenced corresponding to the above expressions (14) and (15), because of a change in effective rolling radiuses of the tires $W_i$ due to the load movement of the vehicle.

Therefore, as shown in FIG. 3, the turning radius R of the vehicle, in which the influence of the load movement of the vehicle is excluded, is firstly calculated (step S3) in the turning radius calculation processing described hereinafter.

Then, the rotational angular velocities $F1_i$ after initial correction calculated in the above step S2 are corrected, on the basis of the above calculated turning radius R, so as to exclude scatter caused by the tire turning radius difference (step S4). Specifically, the rotational angular velocities $F1_i$ after initial correction are corrected according to the following equations (16) to (19):

$$F2_1 = \frac{|R|}{\sqrt{(R-Tw/2)^2 + WB^2}} \times F1_1 \quad (16)$$

$$F2_2 = \frac{|R|}{\sqrt{(R+Tw/2)^2 + WB^2}} \times F1_2 \quad (17)$$

$$F2_3 = \frac{|R|}{|R-Tw/2|} \times F1_3 \quad (18)$$

$$F2_4 = \frac{|R|}{|R+Tw/2|} \times F1_4 \quad (19)$$

Thereby, rotating angular velocities $F2_i$ in which scatter caused by the tire turning radius difference are excluded can be obtained. That is, the rotational angular velocities $F2_1$, $F2_2$, $F2_3$ and $F2_4$ become almost the same values which correspond to the speed of the vehicle, unless the pneumatic pressure drops in any tire.

In the above equations (16) to (19), WB is a wheel base of the vehicle.

In addition, the correction according to the above equations (16) to (19) is a processing performed on the assumption that the vehicle is an FF vehicle, as described above. If the vehicle is an FR (front engine-rear drive) vehicle, the correction is performed according to the following equations (20) to (23). In this case, the front tires $W_1$ and $W_2$ are following tires, and the rear tires $W_3$ and $W_4$ are driving tires.

$$F2_1 = \frac{|R|}{|R-Tw/2|} \times F1_1 \quad (20)$$

$$F2_2 = \frac{|R|}{|R+Tw/2|} \times F1_2 \quad (21)$$

$$F2_3 = \frac{|R|}{\sqrt{(R-Tw/2)^2 + WB^2}} \times F1_3 \quad (22)$$

$$F2_4 = \frac{|R|}{\sqrt{(R+Tw/2)^2 + WB^2}} \times F1_4 \quad (23)$$

The above rotational angular velocities $F_i$ sometimes contain an error depending on the turning radius R of the vehicle, speed V of the vehicle, rear/front acceleration of each tire $W_i$ and magnitude of the lateral acceleration.

That is, when the turning radius R of the vehicle is relatively small, the tire $W_i$ is likely to cause a lateral slip and, therefore, there is much possibility that the calculated rotational angular velocities $F_i$ contain the error. In addition, when the speed V of the vehicle is considerably low, the detection precision of the wheel speed sensor 1 becomes considerably inferior. Therefore, there is much possibility that the rotational angular velocities $F_i$ calculated contain an error. Furthermore, when the rear/front acceleration of each tire $W_i$ is relatively large, for example, a influence of the slip due to rapid acceleration/deceleration of the vehicle, or the influence on foot breaking of the tire $W_i$, will be considered. Therefore, there is much possibility that the rotational angular velocities $F_i$ calculated contain an error. Furthermore, when the lateral acceleration of the vehicle is comparatively large, the tire $W_i$ is likely to cause a lateral slip and, therefore, there is much possibility that the calculated rotational angular velocities $F_i$ contain an error.

In such cases where there is much possibility that the rotational angular velocities $F_i$ contain an error, it is preferred to reject the rotational angular velocities $F_i$ for the detection of the pressure drop.

Then, the speed V2 of the vehicle and rear/front acceleration $G_i$ of each tire $W_i$ are calculated and, at the same time, the lateral acceleration of the vehicle is obtained from the lateral acceleration sensor 3 (step S5). More concretely, the speed V2 of the vehicle is calculated on the basis of the speed $V2_i$ of each tire $W_i$. The speed $V2_i$ of each tire $W_i$ is calculated according to the following equation (24). In the following equation (24), r is a constant corresponding to the effective rolling radius of the tire $W_i$ at the time of linear traveling and is used after reading out from the ROM 2c.

$$V2_i = r \times F2_i \quad (24)$$

The speed V2 of the vehicle is calculated, on the basis of the calculated speed $V2_i$ of each tire $W_i$, according to the following equation (25):

$$V2 = (V2_1 + V2_2 + V2_3 + V2_4)/4 \quad (25).$$

On the other hand, the rear/front acceleration $G_i$ of each tire $W_i$ is calculated according to the following equation (26) letting the speed of each tire $W_i$ calculated in the previous sampling period be $BV2_i$. The numeral 9.8 is inserted in the denominator in the following equation (26) so as to subject the rear/front acceleration $G_i$ of each tire $W_i$ to gravity acceleration conversion. ΔT is a sampling period time.

$$\text{Rear/front acceleration } G_i = (V2_i - BV2_i)/(\Delta \times 9.8) \quad (26)$$

Also, the above speed V2 of the vehicle and rear/front acceleration $G_i$ of each tire $W_i$ may be determined, for example, using outputs of sensors respectively capable of directly detecting the vehicle speed V2 and rear/front acceleration $G_i$.

On the basis of the turning radius R of the vehicle, speed V2 of the vehicle, rear/front acceleration $G_i$ of each tire $W_i$ and lateral acceleration, it is judged whether the rotational angular velocities $F_i$ calculated in the concerned sampling period are to be rejected or not (step S6). For example, the rotational angular velocities $F_i$ are rejected to prohibit the tire pressure drop detection if at least one of the following four conditions is satisfied:

(a) $|R| < R_{TH}$ (e.g. $R_{TH} = 30$ m)

(b) $V2 < V_{TH}$ (e.g. $V_{TH} = 10$ km/h)

(C) MAX {|rear/front acceleration $G_i$|} > $A_{TH}$ (e.g. $A_{TH} = 0.1$ g: g=9.8 m/sec$^2$)

(d) |lateral acceleration| > $G_{TH}$ (e.g. $G_{TH} = 0.4$ g)

As a result of the judgment in the above step S6, if the rotational angular velocities $F_i$ are not rejected, a judged value D is calculated, on the basis of the rotational angular velocities $F2_i$ obtained in the above step S4, according to the following equation (27) (step S7):

$$D = \frac{\frac{F2_1 + F2_4}{2} - \frac{F2_2 + F2_3}{2}}{\frac{F2_1 + F2_2 + F2_3 + F2_4}{4}} \times 100(\%) \quad (27)$$

Then, in order to exclude the influence of the change in slip ratio on the driving tires $W_1$ and $W_2$ when the vehicle is traveling at a corner, the above-calculated judged value D is corrected according to the following equation (28) (step S8). The slip rate represents the degree of difference between the speed of the vehicle and the speed of the tire while driving or breaking torque is exerted on the corresponding wheel.

$$D'=D-(\text{lateral acceleration}/R)\ (c+d\times V2+e\times\text{rear/front acceleration}) \quad (28)$$

In the above equation (28), c, d and e are predetermined constant values.

In addition, in the above equation (28), the rear/front acceleration of the vehicle corresponds to the average of the rear/front accelerations of the four tires $W_i$ obtained according to the above equation (26), as shown in the following equation (29):

Rear/front acceleration=(rear/front acceleration $G_1$+rear/front acceleration $G_2$+rear/front acceleration $G_3$+rear/front acceleration $G_4$)/4 (29).

It is then judged whether the pressure drops or not using the judged value D' after correction thus obtained on the basis of the condition represented by the following expression (30) (step S9):

$$D'<-D_{TH1}\ \text{or}\ D'>D_{TH2} \quad (30)$$

where $-D_{TH1}$ and $D_{TH2}$ respectively indicates a constant, for example, $-D_{TH1}=-0.1$ and $D_{TH2}=0.1$.

As a result, if the judged value D' deviates from the range between $-D_{TH1}$ and $D_{TH2}$ as shown by the reference symbols Sa and Sb in FIG. 5, that is, it satisfies the condition of the above expression (30), it is judged that the pneumatic pressure of any tire drops. On the other hand, if the above judged value D' is within the range between $-D_{TH1}$ and $D_{TH2}$, that is, it does not satisfy the condition of the above expression (30), it is judged that there is no tire whose pneumatic pressure drops.

As described above, it is detected whether the pneumatic pressure of the tire $W_i$ drops or not while the vehicle is traveling. It becomes more convenient for the driver to be informed which tire's pneumatic pressure drops than to merely be informed of the fact that the pneumatic pressure of any of the four tires drops. Therefore, the tire $W_i$ whose pneumatic pressure drops is specified in the step S10.

For example, by using the judged value D' obtained according to the above equation (29), it is possible to specify that:

the reduced pressure tire is $W_1$ or $W_4$ if D'>0, and the reduced pressure tire is $W_2$ or $W_3$ if D'<0.

Furthermore, in the above case, if the vehicle is traveling linearly, it is possible to specify that:

the reduced pressure tire is $W_1$ if $F2_1>F2_2$, the reduced pressure tire is $W_2$ if $F2_1<F2_2$, the reduced pressure tire is $W_3$ if $F2_3>F2_4$, and the reduced pressure tire is $W_4$ if $F2_3<F2_4$.

As a result, once the tire $W_i$ whose pneumatic pressure drops has been specified, the results are outputted to an indicator 5 for display. For example, the indicator 5 is provided with indicating lamps corresponding to the four tires $W_1$, $W_2$, $W_3$ and $W_4$, respectively. When it is detected that the pneumatic pressure of any tire drops, the indicating lamp corresponding to the reduced pressure tire is turned on.

Figure 6:
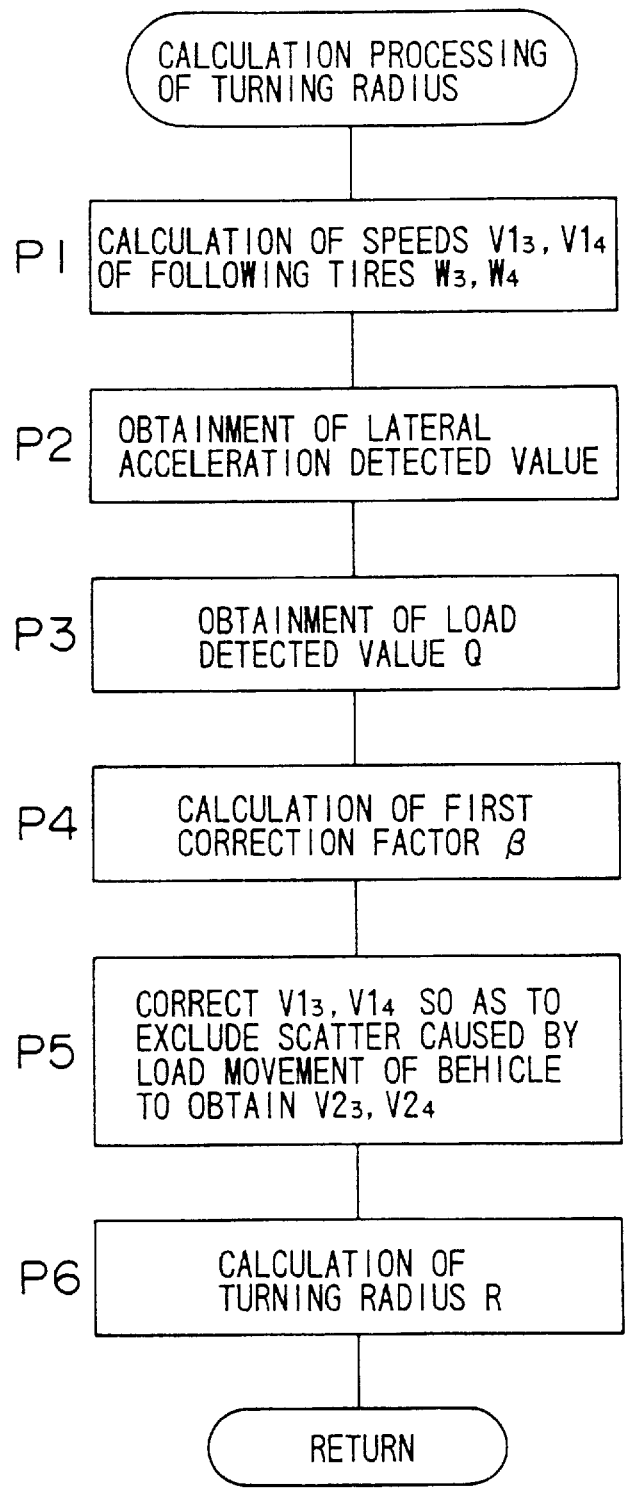
FIG. 6 is a flow chart for explaining the calculation processing of the turning radius according to the first embodiment of the present invention.

FIG. 6 is a flow chart for explaining the calculation processing of the turning radius of the step S3 of FIG. 3. Firstly, the speeds $V1_3$ and $V1_4$ of the following tires $W_3$ and $W_4$ are calculated, on the basis of the rotational angular velocities $F1_3$ and $F1_4$ of the following tires $W_3$ and $W_4$ which has been subjected to the initial correction in the step S2 of FIG. 3, according to the following equations (31) and (32), (step P1):

$$V1_3=r\times F1_3 \quad (31)$$

$$v1_4=r\times F1_4 \quad (32)$$

r is a constant corresponding to the effective radius of the tire $W_i$ at the time of linear traveling, as described above, and is read out from the ROM 2c.

The reason why the speeds $V1_3$ and $V1_4$ of only the following tires $W_3$ and $W_4$ are calculated is as follows. That is, the driving tire $W_1$ on the inside of the corner is not suitable for calculating the turning radius R, accurately, because it is liable to cause a slip.

Referring to the above expressions (14) and (15), it is understood that the effective rolling radiuses of the tire $W_i$ having an influence on the calculation of the turning radius R vary corresponding to the lateral acceleration of the vehicle. Therefore, the lateral acceleration of the vehicle is then obtained from a lateral acceleration sensor 3 (step P2).

In addition, referring to the above expressions (14) and (15), it is understood that the effective rolling radiuses of the tire $W_i$ depend on not only lateral acceleration of the vehicle, but also the first correction factor β. As is apparent from the equation (13), this factor β is determined by the load Q which varies depending on the numbers of persons in the vehicle and the quantity of the baggage loaded in the vehicle. Then, the load Q of the vehicle is obtained from a load sensor 4 (step P3) and the load Q of the vehicle is substituted into the above equation (13) to determine the first correction factor β (step P4).

In order to simplify the processing, for example, the first correction factor β may be previously determined and stored in the ROM 2c of the control unit 2. In this case, there can be a value used β which does not vary depending on the load of the vehicle, but rather is constant.

Then, the speeds $V1_3$ and $V1_4$ of the following tires $W_3$ and $W_4$ calculated in the above step P1 are corrected on the basis of the first correction factor β determined in the above step P4 and lateral acceleration obtained in the above step P2 (step P5). Specifically, the corrections according to the following equations (33) and (34) are performed. Thereby, there can be obtained the speeds $V2_3$ and $V2_4$ in which the influence of the load movement of the vehicle is excluded.

$$V2_3=(1+\beta\times\text{lateral acceleration})\times V1_3 \quad (33)$$

$$V2_4=(1-\beta\times\text{lateral acceleration})\times V1_4 \quad (34)$$

Then, the turning radius R is calculated according to the following equation (35), using the speeds $V2_3$ and $V2_4$ of the following tires $W_3$ and $W_4$ in which the influence of the load movement of this vehicle is excluded (step P6):

$$R = \frac{Tw}{2} \times \frac{V2_4 + V2_3}{V2_4 - V2_3} \tag{35}$$

Thereby, there can be calculated the turning radius R in which the influence of the load movement of the vehicle is excluded.

As described above, according to the present embodiment, the turning radius R of the vehicle is calculated on the basis of the speeds $V_{23}$ and $V_{24}$ of the following tires $W_3$ and $W_4$ in which the influence of the load movement of the vehicle is excluded, thereby obtaining an accurate turning radius R in which the influence of the load movement of the vehicle is excluded. Accordingly, it can be judged with certainty whether the vehicle is traveling linearly or traveling at a corner and, therefore, it can be accurately detected whether the pneumatic pressure of any tire $W_i$ drops or not. As a result, safety while the vehicle is traveling can be improved.

In addition, since the rotational angular velocities $F_3$ and $F_4$ of the following tires $W_3$ and $W_4$, which cause hardly any slip, are utilized for the calculation of the turning radius R, the turning radius R can be calculated without taking the occurrence of a slip into consideration. Therefore, it is possible to simplify the processing and to accurately calculate the turning radius R.

<Second embodiment>

Figure 7:
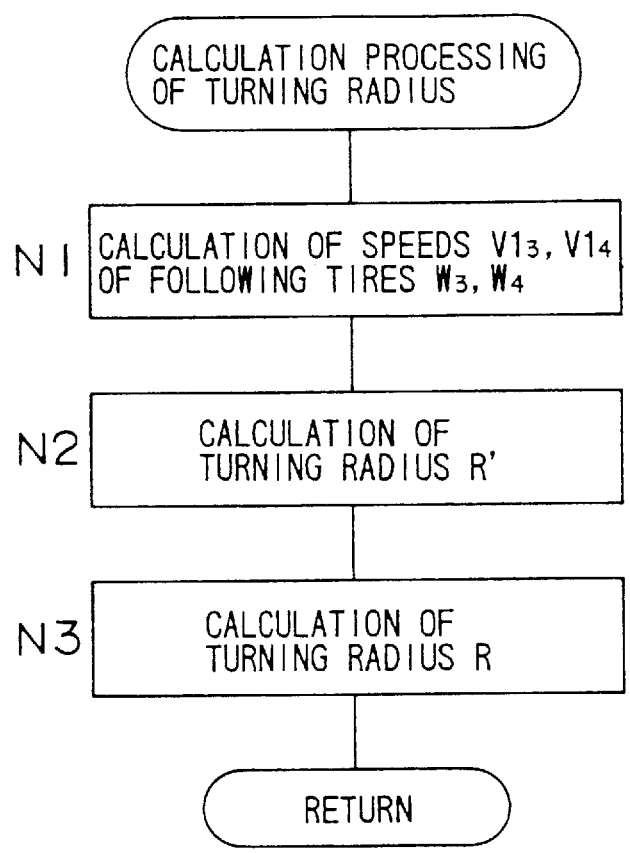
FIG. 7 is a flow chart for explaining the calculation processing of the turning radius according to the second embodiment of the present invention.

FIG. 7 is a flow chart for explaining the calculation processing of the turning radius according to the second embodiment of the present invention. In the explanation of the present embodiment, the above-described FIG. 1, FIG. 2 and FIG. 3 are referred again and the reference symbols used in the above explanation of the first embodiment are used again.

The calculating processing for the turning radius, shown in FIG. 7, is a processing to be performed by the control unit 2 in the step S3 of FIG. 3. In the calculation processing for the turning radius, the speeds $V1_3$ and $V1_4$ of the tires $W_3$ and $W_4$ are firstly calculated on the basis of the rotational angular velocities $F1_3$ and $F1_4$ of the tires $W_3$ and $W_4$ after initial correction obtained in the step S2 of FIG. 3, according to the above equations (31) and (32) (step N1). Then, the turning radius R' of the vehicle is calculated on the basis of the calculated speeds $V1_3$ and $V1_4$ of the following tires $W_3$ and $W_4$, according to the following equation (36) (step N2):

$$R' = \frac{Tw}{2} \times \frac{V1_4 + V1_3}{V1_4 - V1_3} \tag{36}$$

As is apparent from this equation (36), no influence of the load movement of the vehicle is taken into consideration with respect to the turning radius R' calculated in the step N2.

Then, the turning radius R' calculated in the step N2 is corrected so as to exclude the influence of the load movement of the vehicle (step N3). Specifically, the turning radius R of the vehicle after correction is calculated according to the following equation (37):

$$R = R' \times \{\gamma + \sigma \times (V1_4 + V1_3)^2\} \tag{37}$$

Thus, there can be obtained the turning radius R in which the influence of the load movement of the vehicle is excluded. The above $\gamma$ and $\sigma$ are predetermined second and third correction factors, respectively, i.e. constant values which are previously stored in the ROM 2c of the control unit 2.

Figure 8:
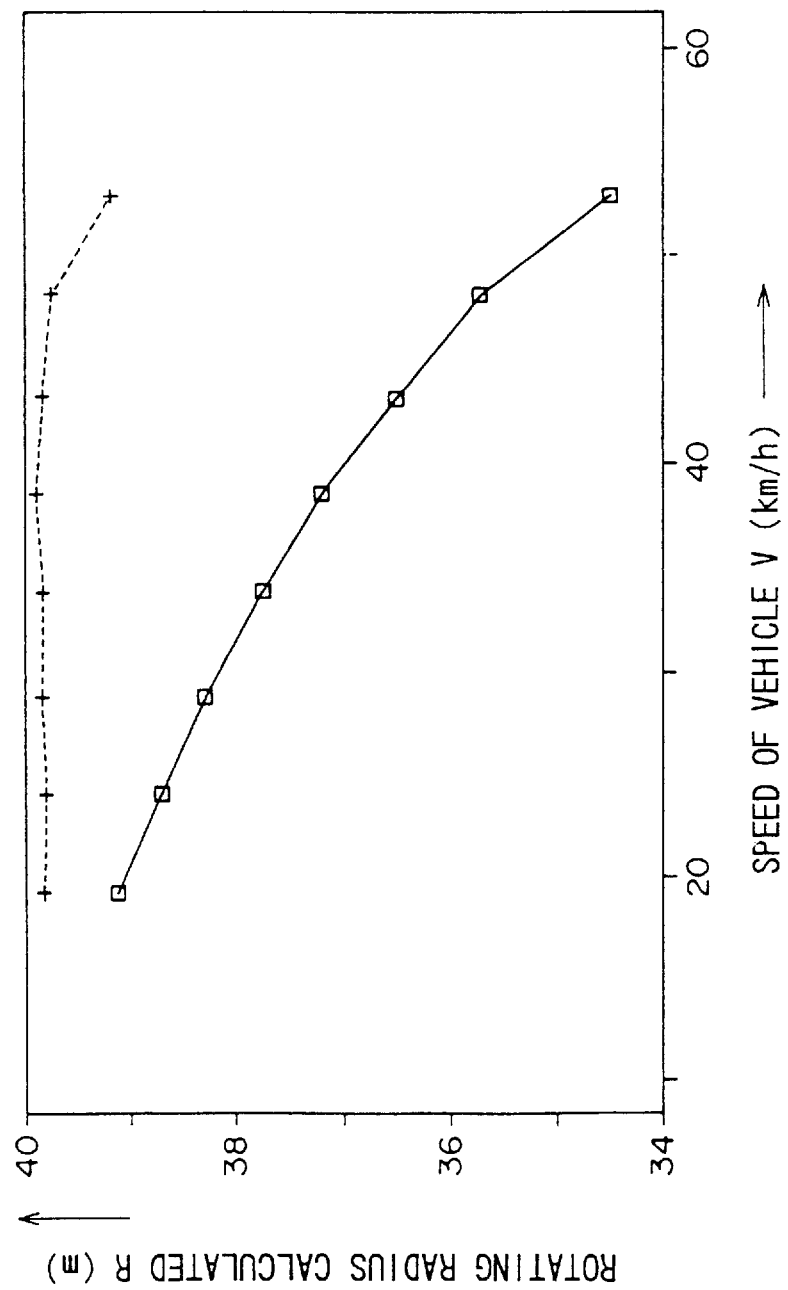
FIG. 8 is a graph showing the test results which illustrate that the influence of the load movement of the vehicle is excluded in the turning radius calculated by the calculation processing of the turning radius in the second embodiment.

FIG. 8 is a graph showing the test results which illustrate, with respect to the speed V of the vehicle, a change in turning radius R of the vehicle obtained according to the above equation (37) and turning radius of the vehicle obtained according to the prior art (see the above equation (1)) wherein no load movement is taken into consideration. The graph of FIG. 8 shows test results obtained when the vehicle traveled on the curved road having a curvature radius of 40 m. In addition, the turning radius of the vehicle calculated according to the present embodiment is represented by the symbol "+" and that according to the prior art is represented by the symbol "□".

The lateral acceleration of the vehicle increases as the speed of the vehicle increases. That is, the more the speed V of the vehicle increases, the more the influence of the load movement of the vehicle on the turning radius R to be calculated increases. Accordingly, the more the speed V increases, the more the difference in rotational angular velocity between right and left tires increases. Therefore, a large error is observed in the prior art.

Referring to FIG. 8, the turning radius R of the vehicle (represented by the symbol "+" in the same figure) obtained according to the above equation (37), does not vary depending on the speed V of the vehicle and is nearly constant, while the turning radius of the vehicle (represented by the symbol "□" in the same figure) according to the prior art, decreases as the speed D of the vehicle increases. That is, as is apparent from the graph of FIG. 8, the influence of the load movement of the vehicle is almost excluded where the turning radius R is determined according the above equation (37).

Next, the derivation of the above equation (37) will be explained.

The turning radius R can be represented by the following equation (38), using the speed V1 calculated on the basis of the rotational angular velocity $F1_1$ after initial correction and the lateral acceleration of the vehicle:

$$R = \frac{Tw}{2} \times \frac{V2_4 + V2_3}{V2_4 - V2_3} = \frac{V1^2}{9.8 \times \text{lateral acceleration}} \tag{38}$$

Solving the equation (38) for the lateral acceleration gives the following equation (39):

$$\text{Lateral acceleration} = \frac{V1^2}{9.8} \times \frac{2}{Tw} \times \frac{V2_4 - V2_3}{V2_4 + V2_3} \tag{39}$$

The relationship between the speeds $V1_3$ and $V1_4$, and $V2_3$ and $V2_4$ of the following tires $W_3$ and $W_4$ is as shown in the above equations (33) and (34), the speed $V1_3+V1_4$ calculated on the basis of the rotational angular velocity $F1_i$ after initial correction wherein no influence of the load movement of the vehicle is taken into consideration, the speeds $V2_3$ and $V2_4$ calculated taking the influence of the load movement of the vehicle into consideration. In addition, by making an approximation so that $V1_3+V1_4 = 2V1 = V2_3+V2_4$, the above equation (39) can be modified into the following equation (40):

$$LA \approx \frac{V1_4{}^2 - V1_3{}^2}{9.8 \times 2 \times Tw} - \frac{\beta \times LA}{9.8 \times 2 \times Tw} \times (V1_4 + V1)^2 \tag{40}$$

wherein LA represents the lateral acceleration.

Furthermore, solving the equation (40) for the lateral acceleration gives the following equation (41):

$$LA \approx \frac{V1_4{}^2 - V1_3{}^2}{9.8 \times 2 \times Tw\{1 + (1/9.8)(\beta/2Tw)(V1_4 + V1_3)^2\}} \quad (41)$$

$$= \frac{(V1_4 + V1_3)^2}{4} \times \frac{1}{9.8} \times \frac{2}{Tw} \times \frac{V1_4 - V1_3}{V1_4 + V1_3} \times$$

$$\frac{1}{\{1 + (1/9.8)(\beta/2Tw)(V1_4 + V1_3)^2\}}$$

wherein LA represents the lateral acceleration.

The turning radiuses R, and R' of the vehicle can be represented by the equations (38) and (36), respectively, as described above. Therefore, the above equation (37) can be obtained by respectively substituting the second and third correction factors γ and σ for "1" and "1/9.8×(β/2Tw)" in the denominator of the above equation (41).

The above third correction factor σ is determined by the first correction factor β, and this first correction factor β has the load Q of the vehicle as one of its parameters. Accordingly, it is more preferable that the third correction factor σ is calculated every time that calculation processing for determining the turning radius, than in the case where the constant correction factor is stored in the ROM 2c of the control unit 2. Therefore, as shown in FIG. 9, the processing for calculating the third correction factor σ may be performed, for example, between the step N2 and the step N3.

Figure 9:
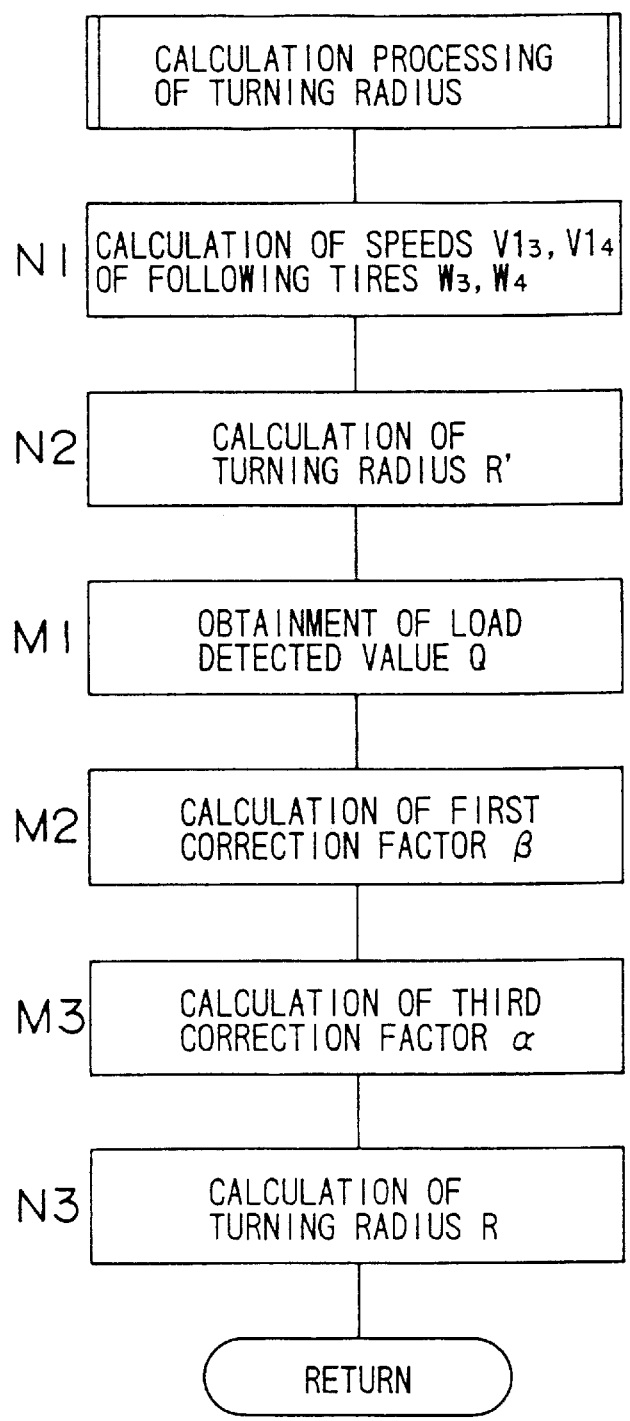
FIG. 9 is a flow chart for explaining the calculation processing of the turning radius according to the modification of the second embodiment of the present invention.

For example, as shown in FIG. 9, the processing for calculating the third correction factor σ contains a first step (step M1) of obtaining the load Q of the vehicle from a load sensor 4, a second step (step M2) of determining the first correction factor β by substituting the resulting load Q into the above equation (13) and a third step (step M3) of determining the correction factor σ by substituting the resulting first correction factor β into "σ=1/9.8×(β/2Tw)".

<Third embodiment>

FIG. 10 is a flow chart for explaining the calculation processing for the turning radius according to the third embodiment of the present invention. In FIG. 10, the same reference symbols as those in FIG. 6 are placed on the steps where the same respective processings are performed as those shown in FIG. 6. In the explanation of the present embodiment, the above-described FIG. 1, FIG. 2 and FIG. 3 are referred to again and the symbols used in the above explanation of the first embodiment are used again. The calculation processing for the turning radius shown in FIG. 7, is a processing to be performed by the control unit 2 in the step S3 of FIG. 3.

Firstly, in the control unit 2, the detected value of the lateral acceleration and that of the load Q are obtained (steps P2 and P3). Then, the correction factor β is determined on the basis of the detected value of the load Q (step P4). Thereafter, the rotational angular velocities $F1_3$ and $F1_4$ of the following tires $W_3$ and $W_4$, which have been subjected to initial correction in the step S2 of FIG. 3, are corrected according to the following equations (42) and (43) so as to exclude the influence of the change in effective rolling radius due to the load movement (step T5). Thereby, the rotational angular velocities $F3_3$ and $F3_4$ after correction are determined.

$$F3_3 = (1+\beta \times \text{lateral acceleration}) F1_3 \quad (42)$$

$$F3_4 = (1-\beta \times \text{lateral acceleration}) F1_4 \quad (43)$$

As is apparent from the above expressions (14) and (15), the effective rolling radius $r_3$ and $r_4$ of the tires $W_3$ and $W_4$ influenced by the load movement of the vehicle are given by the following equations (44) and (45), when using a constant r corresponding to the effective rolling radius of the tire at the time of linear traveling:

$$r_3 = r(1+\beta \times \text{lateral acceleration}) \quad (44)$$

$$r_4 = r(1-\beta \times \text{lateral acceleration}) \quad (45)$$

Accordingly, the speeds $V_3$ and $V_4$ of the tires $W_3$ and $W_4$ are given, respectively, by the following equations (46) and (47):

$$V_3 = r_3 F1_3 = r(1+\beta \times \text{lateral acceleration}) F1_3 \quad (46)$$

$$V_4 = r_4 F1_4 = r(1-\beta \times \text{lateral acceleration}) F1_4 \quad (47)$$

On the other hand, if the effective rolling radiuses of the tires $W_3$ and $W_4$ are respectively fixed to a constant r and do not vary, the relationship between the rotational angular velocities $F3_3$ and $F3_4$ and speeds $V_3$ and $V_4$ of the tires $W_3$ and $W_4$ represented by the following equations (48) and (49) must be established:

$$V_3 = r F3_3 \quad (48)$$

$$V_4 = r F3_4 \quad (49)$$

Accordingly, the above equations (42) and (43) are obtained from the above equations (46) and (49).

After the rotational angular velocities $F3_3$ and $F3_4$ in which the influence of the load movement is excluded are thus determined, the turning radius R of the vehicle is determined according to the following equation (50) (step T6):

$$R = \frac{Tw}{2} \times \frac{F3_4 + F3_3}{F3_4 - F3_3} \quad (50)$$

It will be understood by the following modifications that the equation (50) is equivalent to the above equation (35).

$$\begin{aligned}
R &= \frac{Tw}{2} \times \frac{V2_4 + V2_3}{V2_4 - V2_3} \\
&= \frac{Tw}{2} \times \frac{(1-\beta \times LA) \times V1_4 + (1+\beta \times LA) \times V1_3}{(1-\beta \times LA) \times V1_4 - (1+\beta \times LA) \times V1_3} \\
&= \frac{Tw}{2} \times \frac{(1-\beta \times LA) \times r \cdot F1_4 + (1+\beta \times LA) \times r \cdot F1_3}{(1-\beta \times LA) \times r \cdot F1_4 - (1+\beta \times LA) \times r \cdot F1_3} \\
&= \frac{Tw}{2} \times \frac{(1-\beta \times LA) \times F1_4 + (1+\beta \times LA) \times F1_3}{(1-\beta \times LA) \times F1_4 - (1+\beta \times LA) \times F1_3} \\
&= \frac{TW}{2} \times \frac{F3_4 + F3_3}{F3_4 - F3_3}
\end{aligned}$$

wherein LA represents the lateral acceleration.

As described above, according to the present embodiment, the rotational angular velocities subjected to initial correction are further corrected by taking the load movement of the vehicle into consideration. Since the turning radius R of the vehicle is determined using this corrected rotational angular velocities, there can be determined a turning radius R in which the influence of the change in effective rolling radius due to the load movement of the vehicle is excluded.

<Modification embodiment>

The embodiments of the present invention have been explained as described above, but are not limited thereto. For example, the above embodiments illustrates that the turning radius calculating method or turning radius calculating device of the present invention can be applied for the tire pressure drop detecting device; however, the present invention can also be applied for an Anti-lock Breaking System (ABS) or a Navigation System.

It will be explained, more concretely. That is, where the present invention is applied for an Anti-lock Breaking System, the calculation of turning radius of a vehicle can be utilized as a judgment criteria as to whether the system is allowed to start or not. That is, when the vehicle is traveling at a corner, the tires $W_i$ are likely to cause a literal slip if the tires $W_i$ lock. On the other hand, when the vehicle is traveling linearly, the tires $W_i$ hardly ever lock. Hence, if the system is allowed to start in response to the fact that the calculated turning radius of the vehicle becomes larger than a predetermined threshold value, it is possible to effectively prevent the tires $W_i$ from locking.

In addition, where the present invention is applied for a Navigation System, the calculated turning radius of a vehicle can be applied to a so-called map-matching processing. That is, a comparison is made between the calculated turning radius of the vehicle and the curvature radius of the road obtained from the road map data, and then the comparison data can be taken as one of judgment criteria required for specifying the road on which the vehicle is actually driving.

In addition, in the above embodiments, the detection whether the pneumatic pressure of the tire $W_i$ drops or not is realized by the software processing, but it may be realized by a hardware construction.

Furthermore, the explanation was carried out by taking the case of an FF vehicle, but the vehicle may be an FR vehicle. In this case, it is preferred to utilize the rotational angular velocities $F_1$ and $F_2$ of the following tires $W_1$ and $W_2$ for the calculation of the turning radius R.

The embodiments of the present invention have been described in detail, hereinabove, but the description should be considered as illustrative and not restrictive, the spirit and scope of the present invention being limited only by the appended claims.

We claim:

1. A vehicle turning radius calculating method for determining a turning radius of a vehicle having left and right tires, comprising:
    detecting the respective rotational angular velocities of left and right tires;
    detecting a lateral acceleration of the vehicle;
    detecting the load of the vehicle; and
    determining a turning radius of the vehicle, based on the detected rotational angular velocities, by taking into consideration a change in effective rolling radiuses of the tires due to a load movement of the vehicle, including
        determining a correction factor based on the detected load of the vehicle, and
        excluding an influence on the rotational angular velocities, of the change in effective rolling radiuses of the tires due to the load movement of the vehicle, using the determined correction factor and the detected lateral acceleration of the vehicle.

2. A method according to claim 1, further comprising detecting a lateral acceleration of the vehicle,
    wherein the determining the turning radius of the vehicle includes a step of excluding an influence of the change in effective rolling radiuses of the tires due to the load movement of the vehicle on the rotational angular velocities, based on the detected lateral acceleration of the vehicle.

3. A method according to claim 1, wherein the determining the turning radius of the vehicle includes
    determining respective speeds of the left and right tires, by multiplying the detected rotational angular velocities by a constant corresponding to the effective rolling radius of the tire at the time of linear traveling of the vehicle,
    correcting the speeds of the right and left tires so as to exclude the influence on the rotational angular velocities of the change in effective rolling radiuses of the tires due to the load movement of the vehicle, and
    determining the turning radius of the vehicle based on the corrected speeds of the right and left tires.

4. A vehicle turning radius calculating method for determining a turning radius of a vehicle having left and right tires, comprising:
    detecting rotational angular velocities of respective left and right tires; and
    determining a turning radius of the vehicle, based on the detected rotational angular velocities, by taking a change in effective rolling radiuses of the tires due to a load movement of the vehicle into consideration, including
        determining speeds of left and right tires, respectively, by multiplying the detected rotational angular velocities by a constant corresponding to the effective rolling radius of the tire at the time of linear traveling of the vehicle,
        correcting the speeds of right and left tires so as to exclude the influence on the rotational angular velocities of the change in effective rolling radiuses of the tires due to the load movement of the vehicle, and
        determining the turning radius of the vehicle based on the corrected speeds of the right and left tires;
    wherein the correcting the speeds of right and left tires includes calculating the speeds of the respective right and left tires after correction, according to the following equations:

$$V2_3 = (1+\beta \times a) \times V1_3$$
$$V2_4 = (1-\beta \times a) \times V1_4$$

where $a$ is a lateral acceleration in the lateral direction of the vehicle, which takes a positive value when directed from the left tire to the right tire and takes a negative value when directed from the right tire to the left tire, and where
    $V2_3$ is the speed of the left tire after correction,
    $V2_4$ is the speed of the right tire after correction,
    $V1_3$ is the speed of the left tire before correction, obtained by the determining speeds,
    $V1_4$ is the speed of the right tire before correction, obtained by the determining speeds, and
    $\beta$ is a correction factor given by the equation
        $\beta = (Q \times H \times \alpha)/Tw \times 100$, Q being a load of the vehicle, and H being a height from the ground surface of the tire to a center of gravity of the vehicle, $\alpha$ being a change rate (%) of the effective rolling radius of the tire to the load, and Tw being a distance between the right and left tires.

5. A method according to claim 4, wherein the determining the turning radius of the vehicle includes calculating the turning radius R of the vehicle according to the following equation:

$$R = \frac{Tw}{2} \times \frac{V2_4 + V2_3}{V2_4 - V2_3}.$$

6. A vehicle turning radius calculating method for determining a turning radius of a vehicle having left and right tires, comprising:

detecting rotational angular velocities of the respective left and right tires; and determining a turning radius of the vehicle, based on the detected rotational angular velocities, by taking into consideration a change in effective rolling radiuses of the tires due to a load movement of the vehicle, including determining a first vehicle turning radius R' in which the influence of the load movement of the vehicle is not taken into consideration, based on the detected rotational angular velocities, and determining a second vehicle turning radius R by correcting the first vehicle turning radius R' taking into consideration the influence of the change in effective rolling radiuses due to the load movement of the vehicle.

7. A method according to claim 6, further comprising determining a correction factor based on the load of the vehicle, wherein the determining the second vehicle turning radius R includes correcting the first vehicle turning radius R' using the correction factor so as to exclude the influence on the rotational angular velocities, of the change in effective rolling radiuses of the tires due to the load movement of the vehicle.

8. A method according to claim 7, further comprising detecting the load of the vehicle.

9. A method according to claim 6, wherein the determining the first vehicle turning radius R' includes determining respective speeds of the left and right tires, by multiplying the detected rotational angular velocities by a constant corresponding to the effective rolling radius of the tire at the time of linear traveling of the vehicle, and determining the first vehicle turning radius R' based on the respective speeds of the right and left tires.

10. A method according to claim 9, wherein the first vehicle turning radius R' is determined according to the following equation:

$$R' = \frac{Tw}{2} \times \frac{V1_4 + V1_3}{V1_4 - V1_3}.$$

where $V1_3$ is the speed of the left tire, determined by multiplying the detected rotational angular velocity by a constant corresponding to the effective rolling radius of the tire at the time of linear traveling of the vehicle, $V1_4$ is the speed of the right tire, determined by multiplying the detected rotational angular velocity by a constant corresponding to the effective rolling radius of the tire at the time of linear traveling of the vehicle, and Tw is a distance between the right and left tires.

11. A method according to claim 6, wherein the determining the second vehicle turning radius R by correcting the first vehicle turning radius R' includes determining the second vehicle turning radius R according to the following equation:

$$R=R'\times\{\gamma+\sigma\times(V1_4+V1_3)^2\}$$

where

γ and σ indicate respective correction factors,

σ=(1/9.8)×(β/2Tw),

β is a correction factor given by the equation $$\beta=(Q\times H\times\alpha)/Tw\times100,$$

$V1_3$ is a speed of the left tire, determined by multiplying the detected rotational angular velocity by a constant corresponding to the effective rolling radius of the tire at the time of linear traveling of the vehicle, $V1_4$ is a speed of the right tire, determined by multiplying the detected rotational angular velocity by a constant corresponding to the effective rolling radius of the tire at the time of linear traveling of the vehicle, Q is a load of the vehicle, H is a height from the ground surface of the tire to a center of gravity of the vehicle, α is a change rate (%) of the effective rolling radius of the tire to the load, and Tw is a distance between the right and left tires.

12. A vehicle turning radius calculating method for determining a turning radius of a vehicle having left and right tires, comprising:

detecting rotational angular velocities of the respective left and right tires; and determining a turning radius of the vehicle, based on the detected rotational angular velocities, by taking into consideration a change in effective rolling radiuses of the tires due to a load movement of the vehicle, including correcting the detected rotational angular velocities of the respective right and left tires so as to exclude the influence on the rotational angular velocities of the change in effective rolling radiuses of the tires due to the load movement of the vehicle, and determining the turning radius of the vehicle based on the corrected rotational angular velocities of the right and left tires;

wherein the correcting the detected rotational angular velocities includes calculating the rotational angular velocities of right and left tires after correction, $F3_3$ and $F3_4$, according to the following equations:

$$F3_3=(1+\beta\times a)\times F1_3$$

$$F3_4=(1-\beta\times a)\times F1_4$$

where a is a lateral acceleration in a lateral direction of the vehicle, which takes a positive value when directed from the left tire to the right tire and takes a negative value when directed from the right tire to the left tire, $F3_3$ is a rotational angular velocity of the left tire after correction, $F1_3$ is a rotational angular velocity of the left tire before correction, obtained by the detecting rotational angular velocities, $F3_4$ is a rotational angular velocity of the right tire after correction, $F1_4$ is a rotational angular velocity of the right tire before correction, obtained by the detecting rotational angular velocities, and β is a correction factor given by the equation β=(Q×H×α)/Tw×100, Q being a load of the vehicle, H being a height from the ground surface of the tire to a center of gravity of the vehicle, α being a change rate (%) of the effective rolling radius of the tire to the load, and Tw being a distance between the right and left tires.

13. A method according to claim 12, wherein the determining the turning radius of the vehicle includes calculating the turning radius R of the vehicle according to the following equation:

$$R = \frac{Tw}{2} \times \frac{F3_4 + F3_3}{F3_4 - F3_3}.$$

14. A tire pressure drop detecting method, comprising:
determining a turning radius of a vehicle having left and right tires, during a turn, including
detecting rotational angular velocities of the respective left and right tires; and
determining the turning radius of the vehicle, based on the detected rotational angular velocities, by taking into consideration a change in effective rolling radiuses of the tires due to a load movement of the vehicle, so that the influence on the determined turning radius of the vehicle of the changes in effective rolling radiuses of the tires due to the load movement of the vehicle, is excluded;
correcting the detected rotational angular velocities using the determined turning radius of the vehicle, in which the influence of changes in effective rolling radiuses of the tires due to the load movement of the vehicle is excluded, to determine rotational angular velocities in which scatter thereof, caused by a difference in turning radius as between inner and outer wheels of the vehicle during the turn, is excluded;
judging whether the determined turning radius of the vehicle is larger than a predetermined value or not;
determining whether a pneumatic pressure of any tire of the vehicle drops or not, if the determined turning radius of the vehicle is larger than the predetermined value; and
inhibiting the tire pressure drop detection if the determined turning radius of the vehicle is smaller than the predetermined value;
wherein the detecting whether a pneumatic pressure of any tire drops or not includes judging whether the pneumatic pressure of any tire drops or not, based on the corrected rotational angular velocities.

15. A method according to claim 14, further comprising a step of detecting the load of the vehicle.

16. A method according to claim 14, wherein the determining the turning radius of the vehicle includes
determining a first vehicle turning radius R' in which the influence due to the load movement of the vehicle is not taken into consideration, based on the detected rotational angular velocities, and
determining a second vehicle turning radius R by correcting the first vehicle turning radius R' taking into consideration the influence of the change in effective rolling radiuses due to the load movement of the vehicle.

17. A method according to claim 16, further comprising determining a correction factor based on the load of the vehicle,
wherein the determining the second vehicle turning radius R includes correcting the first vehicle turning radius R' using the correction factor so as to exclude the influence on the rotational angular velocities of the change in effective rolling radiuses of the tires due to the load movement of the vehicle.

18. A method according to claim 17, further comprising detecting the load of the vehicle.

19. A method according to claim 16, wherein the determining the first vehicle turning radius R' includes determining speeds of the respective left and right tires by multiplying the detected rotational angular velocities by a constant corresponding to the effective rolling radius of the tire at the time of linear traveling of the vehicle, and
determining the first vehicle turning radius R' based on the determined speeds of the respective left and right tires.

20. A method according to claim 19, wherein the first vehicle turning radius R' is determined according to the following equation:

$$R' = \frac{Tw}{2} \times \frac{V1_4 + V1_3}{V1_4 - V1_3}$$

where
$V1_3$ is the speed of the left tire, determined by multiplying the detected rotational angular velocity by a constant corresponding to the effective rolling radius of the tire at the time of linear traveling of the vehicle,
$V1_4$ is the speed of the right tire, determined by multiplying the detected rotational angular velocity by a constant corresponding to the effective rolling radius of the tire at the time of linear traveling of the vehicle, and
Tw is a distance between the right and left tires.

21. A method according to claim 16, wherein the determining the second vehicle turning radius R by correcting the first vehicle turning radius R' includes determining the second vehicle turning radius R according to the following equation:

$$R = R' \times \{\gamma + \sigma \times (V1_4 + V1_3)^2\}$$

where
$\gamma$ and $\sigma$ indicate respective correction factors,
$\sigma = (1/9.8) \times (\beta/2Tw)$,
$\beta$ is a correction factor given by the equation $$\beta = (Q \times H \times \alpha)/Tw \times 100,$$

$V1_3$ is a speed of the left tire, determined by multiplying the detected rotational angular velocity by a constant corresponding to the effective rolling radius of the tire at the time of linear traveling of the vehicle,
$V1_4$ is a speed of the right tire, determined by multiplying the detected rotational angular velocity by a constant corresponding to the effective rolling radius of the tire at the time of linear traveling of the vehicle,
Q is a load of the vehicle,
H is a height from the ground surface of the tire to a center of gravity of the vehicle,
$\alpha$ is a change rate (%) of the effective rolling radius of the tire to the load, and
Tw is a distance between the right and left tires.

22. A method according to claim 14, wherein the left and right tires are non-driven tires which follow along as the vehicle moves on the ground surface.

23. A method according to claim 14, further comprising specifying a tire whose pneumatic pressure drops, based on the corrected rotational angular velocities, if it is judged that the pneumatic pressure of any tire drops.

24. A method according to claim 14, wherein the determining the turning radius of the vehicle includes
determining the speeds of the respective right and left tires, by multiplying the detected rotational angular velocities by a constant corresponding to the effective rolling radius of the tire at the time of linear traveling of the vehicle;

correcting the speeds of the respective right and left tires so as to exclude the influence on the rotational angular velocities of the change in effective rolling radiuses of the tires due to the load movement of the vehicle; and determining the turning radius of the vehicle based on the corrected speeds of the respective right and left tires;

the correcting the speeds of the respective right and left tires including calculating corrected speeds of the respective right and left tires according to the following equations $$V2_3 = (1+\beta \times a) \times V1_3$$

$$V2_4 = (1-\beta \times a) \times V1_4,$$

where a is a lateral acceleration at the lateral direction of the vehicle, which takes a positive value when directed from the left tire to the right tire and takes a negative value when directed from the right tire to the left tire, $V2_3$ is a speed of the left tire after correction, $V2_4$ is a speed of the right tire after correction, $V1_3$ is a speed of the left tire before correction, obtained by the determining speeds, $V1_4$ is a speed of the right tire before correction, obtained by the determining speeds, and $\beta$ is a correction factor given by the equation $\beta = (Q \times H \times \alpha)/Tw \times 100$, Q being a load of the vehicle, H being a height from the ground surface of the tire to a center of gravity of the vehicle, $\alpha$ being a change rate (%) of the effective rolling radius of the tire to the load, and Tw being a distance between the right and left tires.

25. A method according to claim 24, wherein the determining the turning radius of the vehicle includes calculating the turning radius R of the vehicle according to the following equation:

$$R = \frac{Tw}{2} \times \frac{V2_4 + V2_3}{V2_4 - V2_3}.$$

26. A method according to claim 14, wherein the step of determining the turning radius of the vehicle includes the steps of correcting the detected rotational angular velocities of the right and left tires so as to exclude the influence on the rotational angular velocities of the change in effective rolling radiuses of the tires due to the load movement of the vehicle, and determining the turning radius of the vehicle based on the corrected rotational angular velocities of the right and left tires, wherein the correcting the detected rotational angular velocities includes calculating the rotational angular velocities of the right and left tires after correction, $F3_3$ and $F3_4$, according to the following equation:

$$F3_3 = (1+\beta \times a) \times F1_3$$

$$F3_4 = (1-\beta \times a) \times F1_4$$

where a is a lateral acceleration in a lateral direction of the vehicle, which takes a positive value when directed from the left tire to the right tire and takes a negative value when directed from the right tire to the left tire, $F3_3$ is a rotational angular velocity of the left tire after correction, $F1_3$ is a rotational angular velocity of the left tire before correction, obtained by the detecting rotational angular velocities, $F3_4$ is a rotational angular velocity of the right tire after correction, $F1_4$ is a rotational angular velocity of the right tire before correction, obtained by the detecting rotational angular velocities, and $\beta$ is a correction factor given by the equation $\beta = (Q \times H \times \alpha)/Tw \times 100$, Q being a load of the vehicle, H being a height from the ground surface of the tire to a center of gravity of the vehicle, $\alpha$ being a change rate (%) of the effective rolling radius of the tire to the load, and Tw being a distance between the right and left tires.

27. A method according to claim 26, wherein the determining the turning radius of the vehicle includes calculating the turning radius R of the vehicle according to the following equation:

$$R = \frac{Tw}{2} \times \frac{F3_4 + F3_3}{F3_4 - F3_3}.$$

28. A turning radius calculating device for determining a turning radius of a vehicle having left and right tires, comprising:

rotational angular velocity detecting means for detecting rotational angular velocities of the respective left and right tires;

turning radius determining means for determining the turning radius of the vehicle, based on the rotational angular velocities detected by the rotational angular velocity detecting means, by taking into consideration a change in effective rolling radiuses of the tires due to a load movement of the vehicle;

lateral acceleration detecting means for detecting a lateral acceleration of the vehicle; and load detecting means for detecting a load of the vehicle;

wherein the turning radius determining means includes correction factor determining means for determining a correction factor based on the load of the vehicle detected by the load detecting means, means for excluding from the determination of the turning radius the influence on the rotational angular velocities of the change in effective rolling radiuses of the tires due to the load movement of the vehicle, using the correction factor determined by the correction factor determining means and the lateral acceleration detected by the lateral acceleration detecting means.

29. A device according to claim 28, further comprising lateral acceleration detecting means for detecting a lateral acceleration of the vehicle, wherein the turning radius operating means includes means for excluding the influence on the rotational angular velocities of the change in effective rolling radiuses of the tires due to the load movement of the vehicle, based on the lateral acceleration detected by the lateral acceleration detecting means.

30. A device according to claim 28, wherein the turning radius operating means includes means for determining the respective speeds of left and right tires by multiplying the detected rotational angular velocities by a constant corresponding to the effective rolling radius of the tire at the time of linear traveling of the vehicle, means for correcting the respective speeds of right and left tires so as to exclude the influence on the rotational angular velocities of the change in effective rolling radiuses of the tires due to the load movement of the vehicle, and means for determining the turning radius of the vehicle based on the respective corrected speeds of the right and left tires.

31. A turning radius calculating device for determining a turning radius of a vehicle having left and right tires, comprising:

rotational angular velocity detecting means for detecting rotational angular velocities of the respective left and right tires; and turning radius determining means for determining the turning radius of the vehicle, based on the rotational angular velocities detected by the rotational angular velocity detecting means, by taking into consideration a change in effective rolling radiuses of the tires due to a load movement of the vehicle;

wherein the turning radius determining means includes means for determining speeds of the respective left and right tires, by multiplying the detected rotational angular velocities by a constant corresponding to the effective rolling radius of the tire at a time of linear traveling of the vehicle, means for correcting the speeds of the respective right and left tires so as to exclude the influence on the rotational angular velocities, of the change in effective rolling radiuses of the tires due to the load movement of the vehicle, and means for determining the turning radius of the vehicle based on the corrected speeds of the respective right and left tires; and wherein the means for correcting the speeds of the respective right and left tires includes means for finding the speeds after correction of the respective right and left tires, according to the following equations:

$$V2_3 = (1+\beta \times a) \times V1_3$$

$$V2_4 = (1-\beta \times a) \times V1_4,$$

where a is a lateral acceleration at the lateral direction of the vehicle, which takes a positive value when directed from the left tire to the right tire and takes a negative value when directed from the right tire to the left tire, $V2_3$ is a speed of the left tire after correction, $V2_4$ is a speed of the right tire after correction, $V1_3$ is a speed of the left tire before correction, obtained by the speeds determining means, $V1_4$ is a speed of the right tire before correction, obtained by the speeds determining means, and $\beta$ is a correction factor given by the equation $\beta = (Q \times H \times \alpha)/Tw \times 100$, Q being a load of the vehicle, H being a height from the ground surface of the tire to a center of gravity of the vehicle, $\alpha$ being a change rate (%) of the effective rolling radius of the tire to the load, and Tw being a distance between the right and left tires.

32. A device according to claim 31, wherein the turning radius determining means for determining the turning radius R of the vehicle according to the following equation:

$$R = \frac{Tw}{2} \times \frac{V2_4 + V2_3}{V2_4 - V2_3}.$$

33. A turning radius calculating device for determining a turning radius of a vehicle having left and right tires, comprising:

rotational angular velocity detecting means for detecting rotational angular velocities of the respective left and right tires; and turning radius determining means for determining the turning radius of the vehicle based on the rotational angular velocities detected by the rotational angular velocity detecting means, by taking into consideration a change in effective rolling radiuses of the tires due to a load movement of the vehicle, wherein the turning radius determining means includes means for determining a first vehicle turning radius R' without consideration of the influence of the load movement of the vehicle, based on the rotational angular velocities detected by the rotational angular velocity detecting means, and means for determining a second vehicle turning radius R by correcting the determined first vehicle turning radius R', taking into consideration the influence of the change in effective rolling radiuses due to the load movement of the vehicle.

34. A device according to claim 33, further comprising means for determining a correction factor based on a load of the vehicle, wherein the means for determining the second vehicle turning radius R includes means for correcting the first vehicle turning radius R' using the correction factor, so as to exclude the influence on the rotational angular velocities of the change in effective rolling radiuses of the tires due to the load movement of the vehicle.

35. A device according to claim 34, further comprising load detecting means for detecting a load of the vehicle, wherein the means for determining the correction factor determines the correction factor using the load of the vehicle detected by the load detecting means.

36. A device according to claim 33, wherein the means for determining the first vehicle turning radius R' includes means for determining the speeds of the respective left and right tires by multiplying the rotational angular velocities detected by the rotational angular velocity detecting means by a constant corresponding to the effective rolling radius of the tire at the time of linear traveling of the vehicle, and means for determining the first vehicle turning radius R' based on the speeds of the respective right and left tires.

37. A device according to claim 36, wherein the means for determining the first vehicle turning radius R' includes means for determining the first vehicle turning radius R' according to the following equation:

$$R' = \frac{Tw}{2} \times \frac{V1_4 + V1_3}{V1_4 - V1_3}$$

where $V1_3$ is the speed of the left tire, determined by multiplying the detected rotational angular velocity by a constant corresponding to the effective rolling radius of the tire at the time of linear traveling of the vehicle, $Vl_4$ is the speed of the right tire, determined by multiplying the detected rotational angular velocity by a constant corresponding to the effective rolling radius of the tire at the time of linear traveling of the vehicle, and Tw is a distance between the right and left tires.

38. A device according to claim 33, wherein the means for determining the second vehicle turning radius R by correcting the first vehicle turning radius R' includes means for determining the second vehicle turning radius R according to the following equation:

$$R=R'\times\{\gamma+\sigma\times(Vl_4+Vl_3)^2\}$$

where

γ and σ indicate respective correction factors,
σ=(1/9.8)×(β/2Tw),
β is a correction factor given by the equation $$\beta=(Q\times H\times\alpha)/Tw\times100,$$

$Vl_3$ is a speed of the left tire, determined by multiplying the detected rotational angular velocity by a constant corresponding to the effective rolling radius of the tire at the time of linear traveling of the vehicle, $Vl_4$ is a speed of the right tire, determined by multiplying the detected rotational angular velocity by a constant corresponding to the effective rolling radius of the tire at the time of linear traveling of the vehicle, Q is a load of the vehicle, H is a height from the ground surface of the tire to a center of gravity of the vehicle, α is a change rate (%) of the effective rolling radius of the tire to the load, and Tw is a distance between the right and left tires.

39. A turning radius calculating device for determining a turning radius of a vehicle having left and right tires, comprising:

rotational angular velocity detecting means for detecting rotational angular velocities of the respective left and right tires, and turning radius determining means for determining the turning radius of the vehicle based on the rotational angular velocities detected by the rotational angular velocity detecting means, by taking into consideration a change in effective rolling radiuses of the tires due to a load movement of the vehicle, the turning radius determining means including means for correcting the rotational angular velocities of the respective right and left tires detected by the rotational angular velocity detecting means so as to exclude the influence on the rotational angular velocities, of the change in effective rolling radiuses of the tires due to the load movement of the vehicle, and means for determining the turning radius of the vehicle based on the corrected rotational angular velocities of the right and left tires;

wherein the means for correcting the detected rotational angular velocities calculates the corrected rotational angular velocities of the right and left tires according to the following equations:

$$F3_3=(1+\beta\times a)\times F1_3$$

$$F3_4=(1-\beta\times a)\times F1_4$$

where a is a lateral acceleration in a lateral direction of the vehicle, which takes a positive value when directed from the left tire to the right tire and takes a negative value when directed from the right tire to the left tire, $F3_3$ is a rotational angular velocity of the left tire after correction, $F1_3$ is a rotational angular velocity of the left tire before correction, obtained by the rotational angular velocity detecting means, $F3_4$ is a rotational angular velocity of the right tire after correction, $F1_4$ is a rotational angular velocity of the right tire before correction, obtained by the rotational angular velocity detecting means, and β is a correction factor given by the equation
β=(Q×H×α)/Tw×100, Q being a load of the vehicle, H being a height from the ground surface of the tire to a center of gravity of the vehicle, α being a change rate (%) of the effective rolling radius of the tire to the load, and Tw being a distance between the right and left tires.

40. A device according to claim 39, wherein the means for determining the turning radius of the vehicle based on the corrected rotational angular velocities of the right and left tires calculates the turning radius R of the vehicle according to the following equation:

$$R = \frac{Tw}{2} \times \frac{F3_4+F3_3}{F3_4-F3_3}.$$

41. A tire pressure drop detecting device, comprising:

a vehicle turning radius calculating device for determining a turning radius of a vehicle having left and right tires, during a turn, including rotational angular velocity detecting means for detecting rotational angular velocities of the respective left and right tires, and turning radius determining means for determining the turning radius of the vehicle, based on the rotational angular velocities detected by the rotational angular velocity detecting means, by taking into consideration a change in effective rolling radiuses of the tires due to a load movement of the vehicle;

means for judging whether the turning radius of the vehicle determined by the vehicle turning radius calculating device is larger than a predetermined value or not;

pneumatic pressure drop determining means for determining, when the turning radius of the vehicle is larger than the predetermined value, whether or not a pneumatic pressure of any tire of the vehicle drops;

means for inhibiting the detection of the tire pressure drop when the turning radius of the vehicle is smaller than the predetermined value; and means for correcting the detected rotational angular velocities using the turning radius of the vehicle, in which the influence of changes in effective rolling radiuses of the tires due to the load movement of the vehicle is excluded, thereby to determine corrected rotational angular velocities in which scatter of the rotational angular velocities between the left and right tires, caused by a difference in turning radius as between inner and outer wheels of the vehicle during the turn, is corrected;

wherein the pneumatic pressure drop determining means determines whether or not the pneumatic pressure of any tire of the vehicle drops, based on the corrected rotational angular velocities.

42. A device according to claim 41, further comprising lateral acceleration detecting means for detecting a lateral acceleration of the vehicle; and load detecting means for detecting a load of the vehicle, wherein the turning radius determining means includes correction factor determining means for determining a correction factor based on the load of the vehicle detected by the load detecting means, and means for excluding from the determination of the turning radius the influence on the rotational angular velocities of the change in effective rolling radiuses of the tires due to the load movement of the vehicle, using the correction factor determined by the correction factor determining means and the lateral acceleration detected by the lateral acceleration detecting means.

43. A device according to claim 41, wherein the turning radius determining means includes means for determining a first vehicle turning radius R', without consideration of the influence of load movement of the vehicle, based on the rotational angular velocities detected by the rotational angular velocity detecting means, and means for determining a second vehicle turning radius R by correcting the resulting first vehicle turning radius R', taking into consideration the influence of the change in effective rolling radiuses due to the load movement of the vehicle.

44. A device according to claim 43, further comprising means for determining a correction factor based on a load of the vehicle, wherein the means for determining the second vehicle turning radius R includes means for correcting the first vehicle turning radius R' using the correction factor, so as to exclude the influence on the rotational angular velocities of the change in effective rolling radiuses of the tires due to the load movement of the vehicle.

45. A device according to claim 44, further comprising load detecting means for detecting a load of the vehicle, wherein the means for determining the correction factor determines the correction factor using the load of the vehicle detected by the load detecting means.

46. A device according to claim 43, wherein the means for determining the first vehicle turning radius R' includes means for determining the speeds of the respective left and right tires by multiplying the rotational angular velocities detected by the rotational angular velocity detecting means by a constant corresponding to the effective rolling radius of the tire at the time of linear traveling of the vehicle, and means for determining the first vehicle turning radius R' based on the speeds of the respective right and left tires.

47. A device according to claim 46, wherein the means for determining the first vehicle turning radius R' includes means for determining the first vehicle turning radius R' according to the following equation:

$$R' = \frac{Tw}{2} \times \frac{V1_4 + V1_3}{V1_4 - V1_3}$$

where $V1_3$ is the speed of the left tire, determined by multiplying the detected rotational angular velocity by a constant corresponding to the effective rolling radius of the tire at the time of linear traveling of the vehicle, $V1_4$ is the speed of the right tire, determined by multiplying the detected rotational angular velocity by a constant corresponding to the effective rolling radius of the tire at the time of linear traveling of the vehicle, and Tw is a distance between the right and left tires.

48. A device according to claim 43, wherein the means for determining the second vehicle turning radius R by correcting the first vehicle turning radius R' includes means for determining the second vehicle turning radius R according to the following equation:

$$R = R' \times \{\gamma + \sigma \times (V1_4 + V1_3)^2\}$$

where $\gamma$ and $\sigma$ indicate respective correction factors, $\sigma = (1/9.8) \times (\beta/2Tw)$, $\beta$ is a correction factor given by the equation $$\beta = (Q \times H \times \alpha)/Tw \times 100,$$

$V1_3$ is a speed of the left tire, determined by multiplying the detected rotational angular velocity by a constant corresponding to the effective rolling radius of the tire at the time of linear traveling of the vehicle, $V1_4$ is a speed of the right tire, determined by multiplying the detected rotational angular velocity by a constant corresponding to the effective rolling radius of the tire at the time of linear traveling of the vehicle, Q is a load of the vehicle, H is a height from the ground surface of the tire to a center of gravity of the vehicle, $\alpha$ is a change rate (%) of the effective rolling radius of the tire to the load, and Tw is a distance between the right and left tires.

49. A device according to claim 41, wherein the left and right tires are non-driven tires which follow along as the vehicle moves on a ground surface.

50. A device according to claim 41, further comprising means for specifying a tire whose pneumatic pressure drops, based on the corrected rotational angular velocities, if it is by the pneumatic pressure drop determining means that the pneumatic pressure of any tire drops.

51. A device according to claim 41, wherein the turning radius determining means includes means for determining speeds of the respective left and right tires by multiplying the detected rotational angular velocities by a constant corresponding to the effective rolling radius of the tire at the time of linear traveling of the vehicle, means for correcting the speeds of the respective right and left tires so as to exclude the influence on the rotational angular velocities of the change in effective rolling radiuses of the tires due to the load movement of the vehicle, and means for determining the turning radius of the vehicle based on the corrected speeds of the respective right and left tires, wherein the means for correcting the speeds of the respective right and left tires includes means for calculating the corrected speeds of the respective right and left tires according to the following equation:

$$V2_3 = (1 + \beta \times a) \times V1_3$$

$V2_4 = (1-\beta \times a) \times V1_4,$ where
- $a$ is a lateral acceleration at the lateral direction of the vehicle, which takes a positive value when directed from the left tire to the right tire and takes a negative value when directed from the right tire to the left tire,
- $V2_3$ is a speed of the left tire after correction,
- $V2_4$ is a speed of the right tire after correction,
- $V1_3$ is a speed of the left tire before correction, obtained by the speeds determining means,
- $V1_4$ is a speed of the right tire before correction, obtained by the speeds determining means, and
- $\beta$ is a correction factor given by the equation
  $\beta = (Q \times H \times \alpha)/Tw \times 100$, $Q$ being a load of the vehicle, $H$ being a height from the ground surface of the tire to a center of gravity of the vehicle, $\alpha$ being a change rate (%) of the effective rolling radius of the tire to the load, and $Tw$ being a distance between the right and left tires.

52. A device according to claim 51, wherein the turning radius determining means includes means for calculating the turning radius R of the vehicle according to the following equation:

$$R = \frac{Tw}{2} \times \frac{V2_4 + V2_3}{V2_4 - V2_3}.$$

53. A method according to claim 41, wherein the means for determining the turning radius of the vehicle includes
- means for correcting the detected rotational angular velocities of the right and left tires so as to exclude the influence on the rotational angular velocities of the change in effective rolling radiuses of the tires due to the load movement of the vehicle, and
- means for determining the turning radius of the vehicle based on the corrected rotational angular velocities of the right and left tires, wherein the means for correcting the detected rotational angular velocities includes means for calculating the corrected rotational angular velocities of the right and left tires, $F3_3$ and $F3_4$, according to the following equation:

$F3_3 = (1+\beta \times a) \times F1_3$ $F3_4 = (1-\beta \times a) \times F1_4$ where
- $a$ is a lateral acceleration in a lateral direction of the vehicle, which takes a positive value when directed from the left tire to the right tire and takes a negative value when directed from the right tire to the left tire,
- $F3_3$ is a rotational angular velocity of the left tire after correction,
- $F1_3$ is a rotational angular velocity of the left tire before correction, obtained by the rotational angular velocity detecting means,
- $F3_4$ is a rotational angular velocity of the right tire after correction,
- $F1_4$ is a rotational angular velocity of the right tire before correction, obtained by the rotational angular velocity detecting means, and
- $\beta$ is a correction factor given by the equation
  $\beta = (Q \times H \times \alpha)/Tw \times 100$, $Q$ being a load of the vehicle, $H$ being a height from the ground surface of the tire to a center of gravity of the vehicle, $\alpha$ being a change rate (%) of the effective rolling radius of the tire to the load, and $Tw$ being a distance between the right and left tires.

54. A device according to claim 53, wherein the means for determining the turning radius of the vehicle based on the corrected rotational angular velocities of the right and left tires calculates the turning radius R of the vehicle according to the following equation:

$$R = \frac{Tw}{2} \times \frac{F3_4 + F3_3}{F3_4 - F3_3}.$$

* * * * *